(12) United States Patent  
Mangayil et al.

(10) Patent No.: US 11,226,943 B2
(45) Date of Patent: Jan. 18, 2022

(54) ASSIGNING ACCESS CONTROL FOR FLAT DATA STRUCTURE

(71) Applicant: SAP SE, Walldorf (DE)

(72) Inventors: Harikrishnan Mangayil, Bangalore (IN); Srinivas Vinnakota, Bangalore (IN); Abhishek Nagendra, Bangalore (IN); Sukesh Kaul, Ghaziabad (IN); Subhadeep Khan, Anandapur (IN); Yash Bagadia, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/867,304

(22) Filed: May 5, 2020

(65) Prior Publication Data

US 2021/0349870 A1  Nov. 11, 2021

(51) Int. Cl.
*G06F 16/22* (2019.01)
*G06F 21/62* (2013.01)

(52) U.S. Cl.
CPC ...... *G06F 16/2246* (2019.01); *G06F 16/2255* (2019.01); *G06F 16/2272* (2019.01); *G06F 21/6227* (2013.01); *G06F 2221/2141* (2013.01)

(58) Field of Classification Search
CPC ............. G06F 16/2246; G06F 16/2272; G06F 16/2255
See application file for complete search history.

(56) References Cited

U.S. PATENT DOCUMENTS 7,069,272 B2 * 6/2006 Snyder ................ G06F 16/2246
2001/0034733 A1 * 10/2001 Prompt ................ G06F 16/252
2003/0023952 A1 * 1/2003 Harmon, Jr. ........ G06F 9/45512
  717/106
2003/0110150 A1 * 6/2003 O'Neil .................... G06F 16/86
2004/0117448 A1 * 6/2004 Newman ............... G06F 16/353
  709/206
2004/0181543 A1 * 9/2004 Wu ......................... G06F 16/26

(Continued)

OTHER PUBLICATIONS

Unpublished U.S. Patent Application titled "Analytics Content Network For Content Delivery Embedding", filed Dec. 19, 2019, 32 pages.

*Primary Examiner* — Eliyah S. Harper
(74) *Attorney, Agent, or Firm* — Fountainhead Law Group P.C.

(57) ABSTRACT

A distribution network may efficiently communicate items/item details in a private manner, with different access rights tailored to various tenants residing within a same or different customer landscape. A first input comprising a flat file with items/item details, is received. A second input comprising permissions entries for per-user, per-item direct access rights (e.g., view, read, write, delete) is also received. The first and second inputs are recursively processed to find nearest ancestors having the direct access rights, with a hash maintained including the nearest ancestors. An effective permitted structure (e.g., tree comprising root and leaf nodes) is generated by recursively adding descendant items having inherited access rights, to the nearest ancestors. Ultimately, descendant item(s) are privately distributed to a user with an access right according to the effective permitted structure. Embodiments may be particularly suited to the private distribution of analytics content (e.g., dimensions, stories, views) to various tenants.

18 Claims, 22 Drawing Sheets

(56) References Cited

U.S. PATENT DOCUMENTS

| | | | |
|---|---|---|---|
| 2006/0064428 A1* | 3/2006 | Colaco | G06F 16/86 |
| 2009/0119783 A1* | 5/2009 | Fried | G06F 21/629 |
| | | | 726/28 |
| 2009/0138500 A1* | 5/2009 | Yuan | G06F 16/2246 |
| 2013/0044924 A1* | 2/2013 | Spencer | A61B 8/5223 |
| | | | 382/128 |
| 2014/0304282 A1* | 10/2014 | Eide | H02G 3/0487 |
| | | | 707/754 |
| 2016/0267063 A1* | 9/2016 | Rajvanshi | G06F 40/137 |

\* cited by examiner

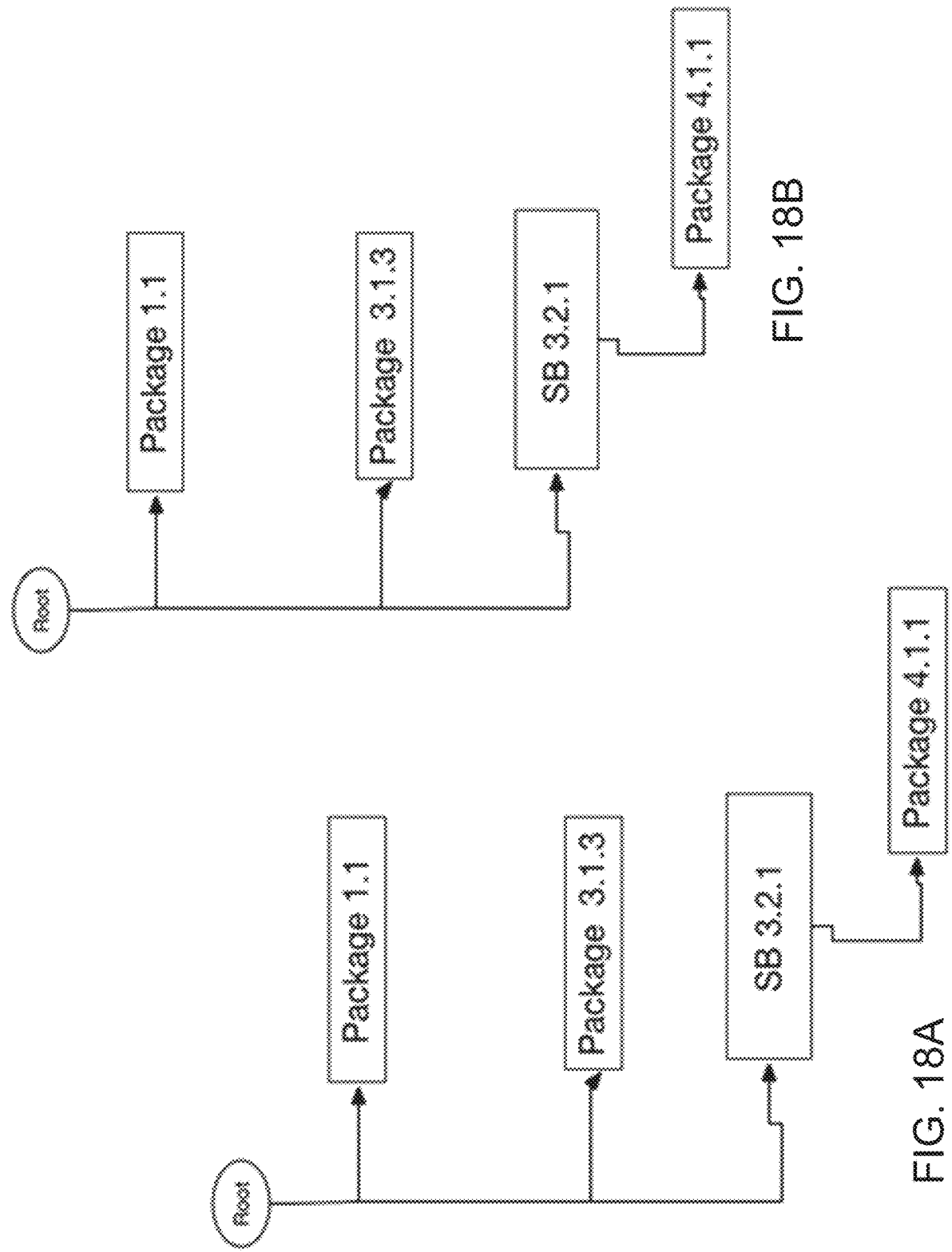

| private_items | | |
|---|---|---|
| item_id | SERIAL8 | <pk> |
| owner_details_id | INT8 | <fk3> |
| state_name | VARCHAR(20) | <fk1> |
| item_type | VARCHAR(20) | <fk2> |
| parent | INT8 | <fk4> |
| allow_subscriptions | BOOL | |
| license_tag_name | VARCHAR(255) | |
| created | TIMESTAMP | |
| last_updated | TIMESTAMP | |
| last_updated_by | INT8 | |
| marked_for_deletion | BOOL | |
| extended_col1 | VARCHAR | |
| extended_col2 | INT8 | |

FIG. 19A

| tenant_users_details | | |
|---|---|---|
| user_details_id | SERIAL8 | <pk> |
| tenant_landscape | VARCHAR(255) | <ak,fk> |
| tenant_uuid | VARCHAR(255) | <ak> |
| user_id | VARCHAR(255) | <ak> |
| user_name | VARCHAR(255) | |
| oem_id | VARCHAR(100) | <ak> |
| erp_number | VARCHAR(100) | <ak> |
| extended_col1 | VARCHAR | |
| extended_col2 | INT8 | |

FIG. 19B permissions

| | |
|---|---|
| item_id | INT8 <pk, fk1> |
| wave_item_id | INT8 <fk2> |
| access_given_to_user_id | INT8 <pk, fk3> |
| access_given_by_user_id | INT8 <fk4> |
| access_given_on | TIMESTAMP |
| read | BOOL |
| write | BOOL |
| grant_access | BOOL |
| change_owner | BOOL |
| delete | BOOL |
| list | BOOL |
| last_updated | TIMESTAMP |
| last_updated_by | INT8 |
| expires | TIMESTAMP |
| marked_for_deletion | BOOL |
| extended_col1 | VARCHAR |
| extended_col2 | INT8 |
| extended_col3 | BOOL |
| extended_col4 | BOOL |

FIG. 19C private_wave_items

| | |
|---|---|
| wave_item_id | SERIAL8 <pk> |
| item_id | INT8 <fk1> |
| wave_item_owner_details_id | INT8 <fk3> |
| wave_version | VARCHAR(50) |
| state_name | VARCHAR(20) <fk2> |

FIG. 19D

| | |
|---|---|
| item_id | INT8 |
| wave_item_id | INT8 |
| user_details_id | INT8 |
| wave_version | VARCHAR(50) |
| completion_time | TIMESTAMP |
| was_successful | BOOL |
| extended_col1 | VARCHAR |

FIG. 19E

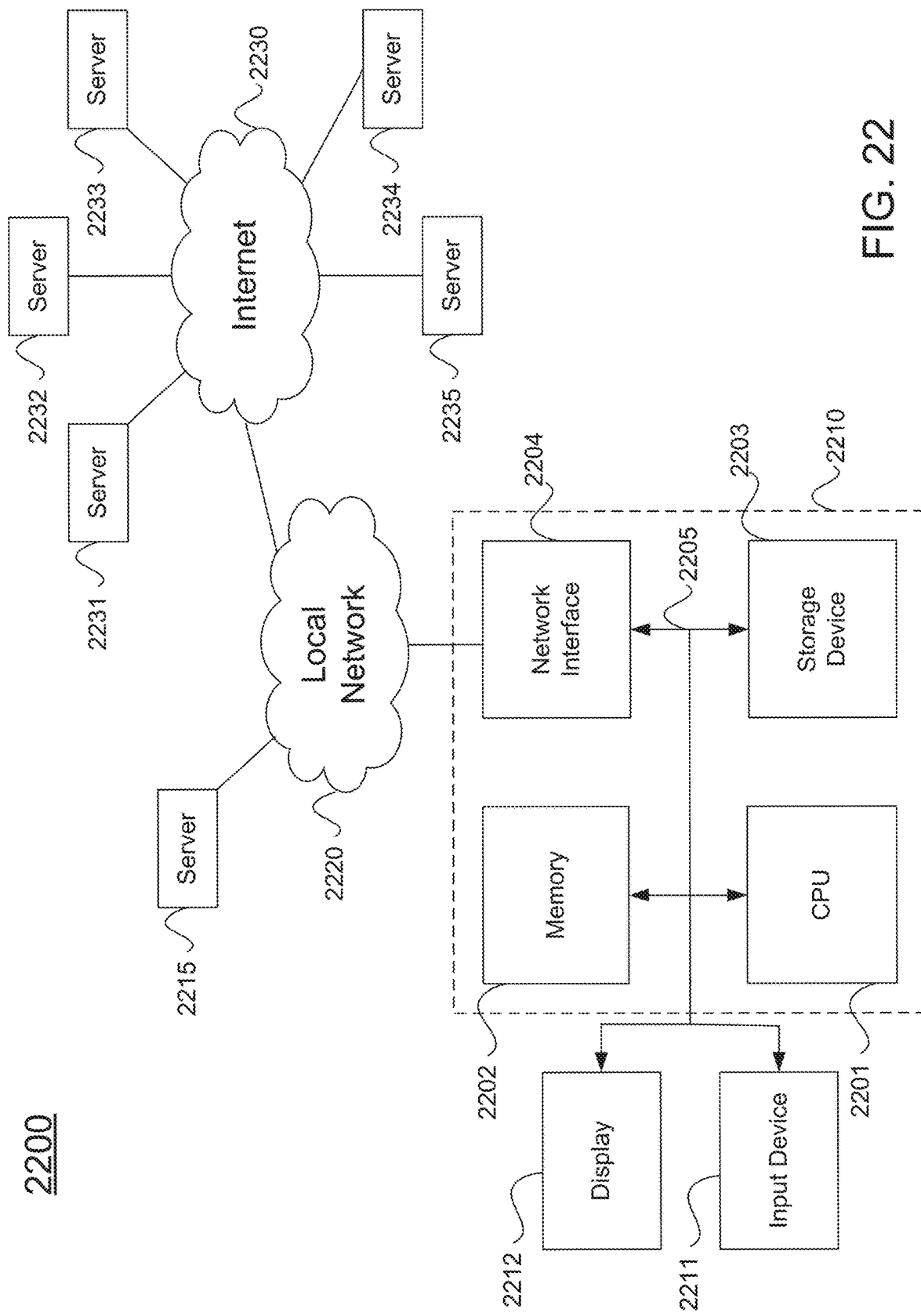

ASSIGNING ACCESS CONTROL FOR FLAT DATA STRUCTURE

BACKGROUND

Unless otherwise indicated herein, the approaches described in this section are not prior art to the claims in this application and are not admitted to be prior art by inclusion in this section.

Software systems permit enterprises to generate and accumulate volumes of data such as product data, financial data, human resources (HR) data, and the like. To aid the enterprise in gleaning meaningful insights from the mass of data, intelligent analytics systems have been developed. These analytics systems afford insights—statistics, facts, trends, and the like determined from the enterprise data. Example insights include, e.g., highest rated product, revenue, margin, actual sales, forecast sales, and the like. Specific types of analytic content can comprise dashboards, Key Performance Indicator (KPI) definitions, and planning scenarios.

Various entities can generate analytic content. For example, a service provider may provide the analytics system. Other entities that generate analytic content can include but are not limited to third-party developers, and OEMs. A service provider offering the analytics system can provide one or more dashboards as analytics content, which a customer using the analytics system access enterprise data and insights. In this manner, best-of-breed analytics content can be provided, and each customer is not required to create their own analytics content.

A distribution network may be used to communicate content from the analytics system to various consumers, such as individual customers and tenants. Where the analytics content is in the form of a flat file (such as an adjacency list), the granting of access rights tailored to various types of consumer can pose a challenge.

SUMMARY

A distribution network may efficiently communicate items/item details in a private manner, with different access rights tailored to various tenants residing within a same or different customer landscape. A first input comprising a flat file with items/item details, is received. A second input comprising permissions entries for per-user, per-item direct access rights (e.g., view, read, write, delete) is also received. The first and second inputs are recursively processed to find nearest ancestors having the direct access rights, with a hash maintained including the nearest ancestors. An effective permitted structure (e.g., tree comprising root and leaf nodes) is generated by recursively adding descendant items having inherited access rights, to the nearest ancestors. Ultimately, descendant item(s) are privately distributed to a user with an access right according to the effective permitted structure. Embodments may be particularly suited to the private distribution of analytics content (e.g., dimensions, stories, views) to various tenants.

The following detailed description and accompanying drawings provide a better understanding of the nature and advantages of various embodiments.

BRIEF DESCRIPTION OF THE DRAWINGS

FIG. 18A shows an import structure visible by a second tenant. FIG. 18B shows an export structure visible by the second tenant.

FIGS. 19A-E show details of various components of that database schema.

FIG. 22 illustrates an example computer system.

DETAILED DESCRIPTION

Described herein are methods and apparatuses that implement access control. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
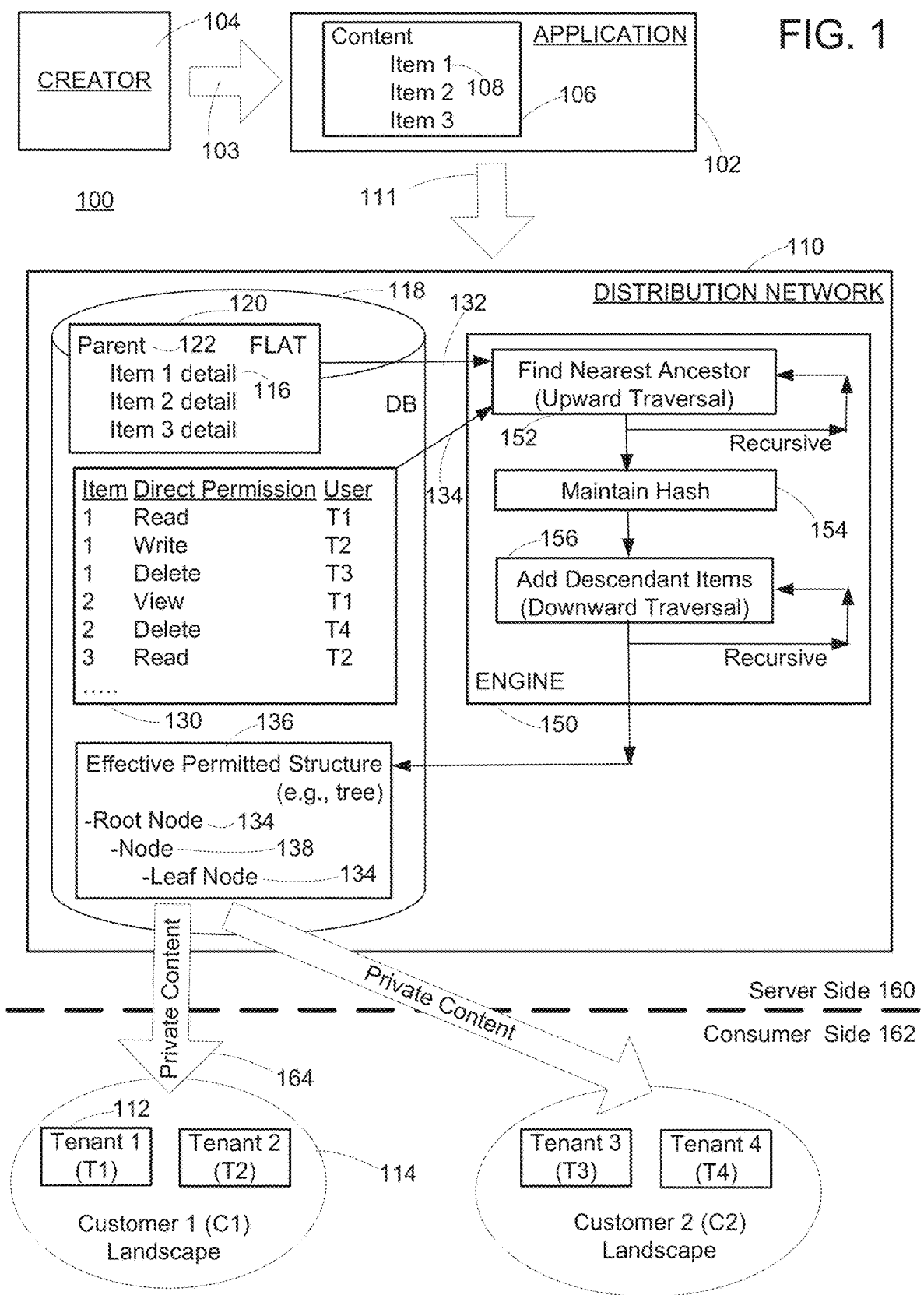
FIG. 1 shows a simplified diagram of a system according to an embodiment.

FIG. 1 shows a simplified diagram illustrating an example system that is configured to implement access control according to an embodiment. Specifically, system 100 comprises application 102 that is accessed 103 by creator 104 in order to create content 106, including item(s) 108, such as dimensions, stories, views, etc.

The application is in communication with distribution network 110, to disseminate 111 content to different entities. Such entities may comprise tenant(s) 112 present within a particular customer landscape 114.

Within the distribution network, item(s) and details 116 thereof (e.g., associated metadata) may be stored within a database 118 and organized according to a flat data structure 120. An example of a flat data structure is a list (e.g., an adjacency list) comprising a parent 122.

Rights to access to various items by various users, may be governed by a permissions table 130 also stored within the database. This table explicitly identifies:

the content (e.g., item #), the nature (e.g., view, read, write, delete) of any direct permission, and the user to whom access rights have been granted (e.g., by tenant #).

In particular, examples of permission entries can delineate access rights of different scope, listed in terms of increasing degrees power below:

View (V). A user can be apprised of the existence of an item.

Read (R). A user can access item contents.

Write (W). A user can modify the contents of an item.

Delete (D). A user can delete an item entirely.

According to embodiments, the flat data structure is provided as one input 132, to engine 150 that is present within the distribution network. The permissions table is provided as another input 134 to the engine.

The engine processes these inputs to create a resulting effective permitted structure, that exhibits a hierarchical organization (e.g., including but not limited to a tree structure). In particular, the effective permitted structure includes at least a root node 134 and a leaf node 136, together with intervening nodes 138 that define a multi-level hierarchical structure.

Details regarding generation of the effective permitted structure by the engine, are now described. In general, the entire tree (without permissions) may be considered as a forest, where each node represents an item.

In a first phase 152, the engine finds the nearest ancestor with permission for items, in a recursive manner starting from the items having direct permission entries. This activity decides the parent in the effective permitted items tree. The nearest ancestor should be null, if for an item no ancestor with direct permission found.

According to one specific example, if the user has permission for an item but does not have permission for any of the ancestors, the item should be structured for the user's permitted structure of the item. The user should not receive permission for the actual folder hierarchy information.

In a second phase, the engine maintains a hash 154 of the visited items to the found nearest ancestor with permission. In this manner, in the upward traversal when finding an ancestor for which the traversal has been already performed, the ancestorWithPermission becomes the ancestorWithPermission of the visited node. Accordingly, no node is visited more than two times, and the traversing the upper part of the tree (starting from the nodes with direct permissions) will be in O(n) in worst case and O(m) in average case, where n and m denotes the number of all items and number of permitted items.

A next phase adds 156 the descendants' items (for which the user has inherited permissions) recursively in the effective permitted tree. This is the downward traversal of the tree. It can be achieved starting from the items/nodes with direct permission.

This phase also traverses all nodes at most only once. As we are starting with the nodes having direct permissions, branches for which the particular user does not have permission, are avoided during the traversal. This reduces the overall complexity of the traversal.

Following construction of the effective permitted structure by the engine, the distribution network is now able to distribute the content in a private manner to various possible users. As indicated in FIG. 1, the distribution network is typically resident on a server side 160, with the various users being present on a consumer side 162.

Accordingly, FIG. 1 shows the distribution of private content 164 to various tenants of customer landscapes, in a manner consistent with access rights that have been granted. Accordingly, specific consumers receive various created items, with access rights commensurate with their permission to view the content created utilizing the application.

Figure 4:
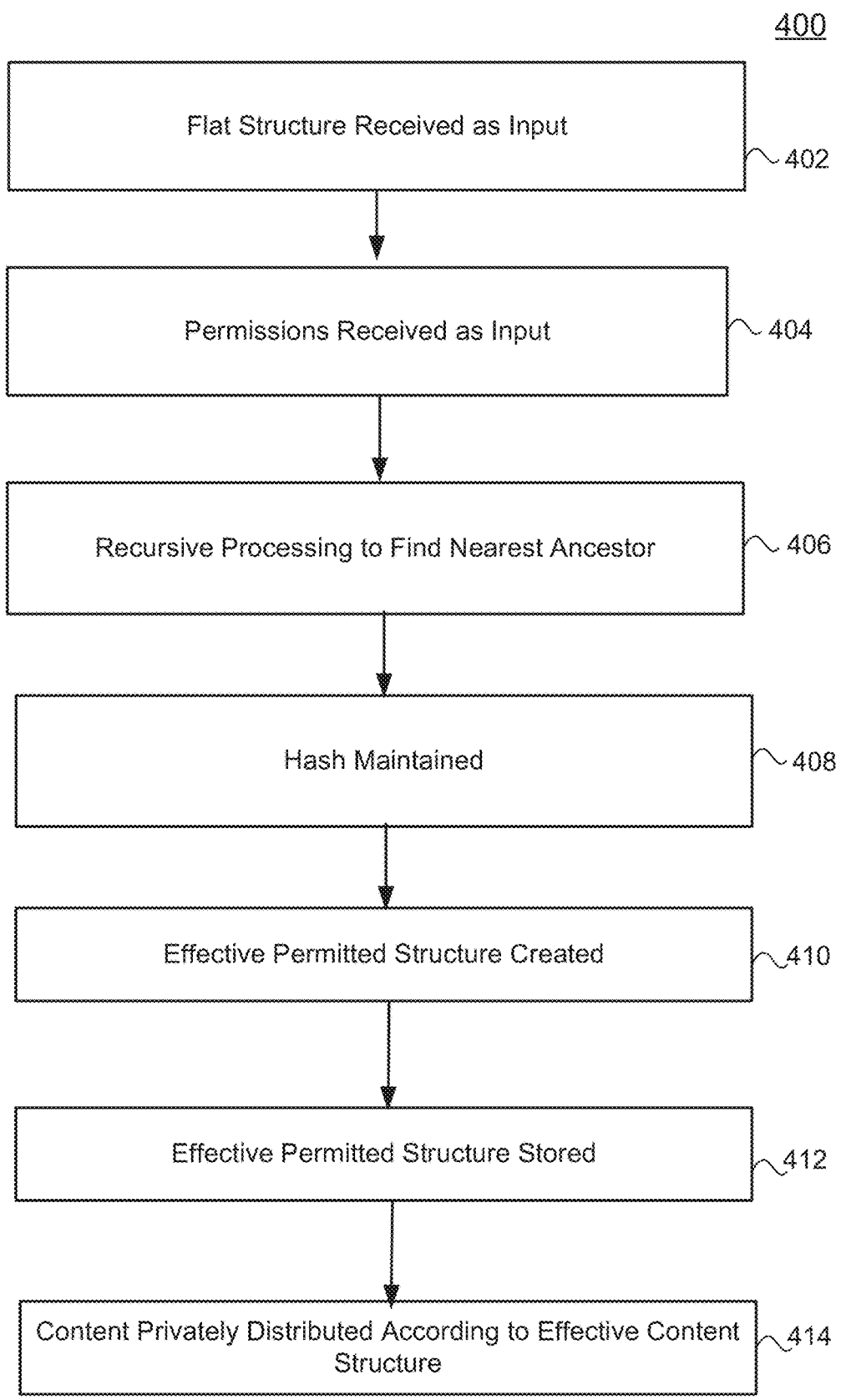
FIG. 4 a simplified flow diagram of a method according to an embodiment.

FIG. 4 is a flow diagram of a method according to an embodiment. At 402, a first input is received comprising a flat data structure comprising a plurality of items and respective item details.

At 404, a second input is received comprising permissions for direct access rights by a plurality of users to the plurality of items.

At 406, the first input and the second input are recursively processed to find nearest ancestors having the direct access rights. At 408, a hash including the nearest ancestors is maintained.

At 410, an effective permitted structure is created by recursively adding descendant items having inherited access rights, to the nearest ancestors. At 412 the effective permitted structure is stored in a database.

At 414, a descendant item is privately distributed to a user with an access right according to the effective permitted structure.

Further details regarding the implementation of access control according to embodiments, are now provided in connection with the following example. In particular, this Example discusses the granting of access rights analytics content generated utilizing the SAP Analytics Cloud (SAC) application, that is available from SAP SE of Walldorf, Germany.

EXAMPLE

Traditionally, a file-based approach may be implemented to provide analytics content to consumers. Under a file-based approach, analytics content is down- and up-loaded to files (e.g., .tgz files (GZIP Compressed Tar Archive files)). However, analytics content has to be provisioned to tenants (e.g., executing an application, in which the analytics content is to be provided). If the analytics content is developed and owned by the service provider (here SAP SE) or by third-parties (e.g., partners of the enterprise), the analytics content has to be shipped together with the SAC application and has to be installed at the point in time when the tenants are upgraded to a respective release of the application.

In order to impart flexibility for content distribution, SAC further includes the Analytics Content Network (ACN). In particular, ACN is one of SAC's important infrastructure components. ACN resides in SAC landscapes as a central component, connecting those landscapes.

Logically, ACN can be understood as a single global content network which can provision or share any SAC content. As ACN is connected out-of-the-box to any SAC tenant, it can provision and share content into any SAC tenant.

ACN supports various end-user workflows. In one workflow, a SAC content creator creates analytics content of various types, including but not limited to:

stories;

models;

dimensions;

connections;

Value-Driver Trees (VDT); and other SAC content types.

If authorized, the analytics content generator can then export this content from the SAC tenant to the ACN by creating a content package. That content package can contain any number of these content items, and be shared with one or more other tenants.

Another end-user workflow supported by ACN allows a SAC content user to view available content packages in a listing, and import those content packages relevant to their analytic workflows. This import can include public content (e.g., templates or demo content), as well as private content that is shared privately with the particular user.

A server system can host one or more cloud-based systems (e.g., SAP Analytics Cloud, SAP Analytics Hub). In some implementations, a cloud-based system further includes an ACN that is used to provision analytics content to one or more applications.

For example, a customer (e.g., an enterprise) can use an application (e.g., SAP SuccessFactors) in a tenant-based scenario, which includes provisioning of the application for a customer within an application tenant that is specific to the customer. Further, and in accordance with particular embodiments, the application can include an analytics system (e.g., SAC) embedded therein. For example, the analytics system can be provided in an analytics system tenant that is embedded in the application tenant.

As introduced above, specific embodiments are directed to an ACN that permits distribution of analytics content for applications having an analytics system embedded therein. More particularly and as described in further detail herein, analytics content is provisioned from the ACN for use with analytics functionality provided by an analytics system that is embedded within an application.

That is, for example, the ACN supports import and export of analytics content to and from resources (e.g., cloud-based resources). For example, the analytics system providing analytics functionality within an application can include a UI (e.g., a "Content Library" UI) that enables a user (e.g., an agent of a customer) to access analytics content from the ACN.

Figure 2:
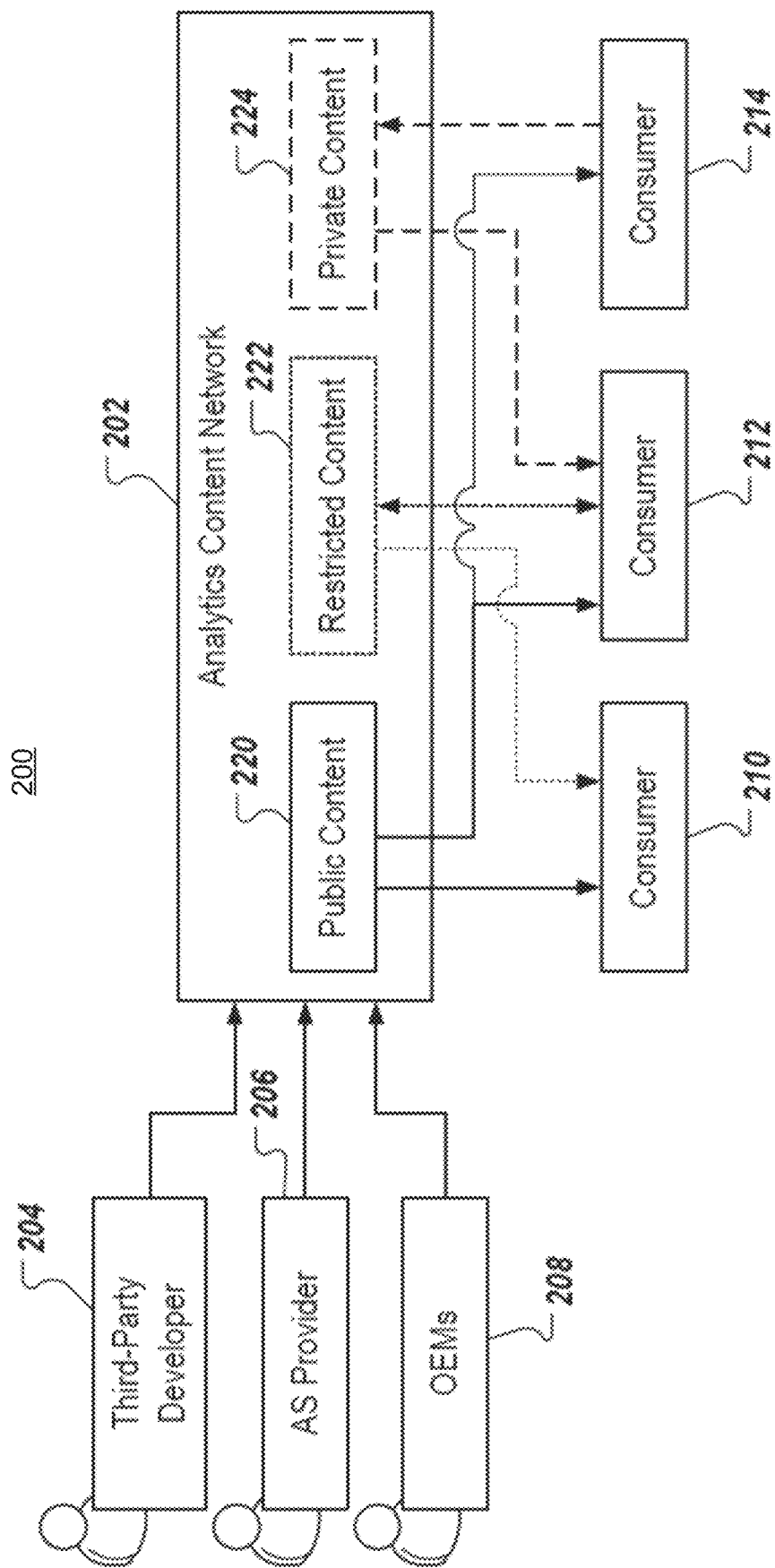
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 includes an ACN 202, analytics content creators 204, 206, 208, and analytics content consumers 210, 212, 214. The ACN 202 includes a public analytics content store 220, a restricted analytics content store 222, and a private analytics content store 224. In some examples, one or more of the analytics content creators 204, 206, 208 provide analytics content that is published to the ACN 202. Example analytics content sources can include, without limitation, a third-party developer (analytics content source 204), an analytics system provider (analytics content source 206) (e.g., SAP SE, which provides SAC), and an OEM (analytics content source 208). In some examples, an OEM can include an enterprise that provides an application, within which the analytics system is embedded. For example, an OEM can include SAP SE, which provides SAP SuccessFactors, within which SAC can be embedded. In some examples, another OEM can provide their own proprietary application, within which SAC can be embedded.

In general, the analytics content creators create one or more types of analytics content. Example analytic content can include, without limitation, stories, models, dimensions, connections, Value-Driver Trees (VDT), dashboards, KPI definitions, and planning scenarios. If authorized, a content creator can export their analytics content to the ACN 202 by creating a content package, which contains one or more items of analytics content. In some examples, content is created using an analytics system tenant and is exported to the ACN 202. For a pre-defined content scenario (e.g., content provided by the AS provider 206), content is created using an internal analytics system tenant, is exported to the ACN 202, and is available to all analytics system tenants. In some examples, an analytics content administrator can view all available content packages. If authorized, one or more content packages can be imported from the ACN into one or more analytics system tenants. In this manner, the analytics content is available for use in the respective analytics system tenants.

Example use cases for analytics content can include template content, demo content, and so-called "out-of-the-box" usable content. In some examples, template content includes analytics content that can be populated (e.g., with enterprise data, visualizations, analytical data), and can be modified by users. In some examples, demo content can be described as a lighter variant of template content, which typically comes with demo data (e.g., demo enterprise data) in the content package. In this manner, the analytics content can be demoed within the analytics system tenant immediately using the demo data, but is not usable in a production scenario. In this manner, a user can test the analytics content before importing a production-usable version of the analytics content. In some examples, the "out-of-the-box" usable analytics content is delivered together with applications which "fit" to the analytical content, and which keep its data actual.

In further detail, creation of analytics content can be described as a development task. For example, a developer (e.g., computer programmer) develops the analytics content in computer-executable code. For example, a dashboard is programmatically defined and is stored in one or more files (e.g., content packages). When ready for consumption (e.g., after final review, testing) the analytics content is exported to the ACN 202 (e.g., the developer manually exports content packages).

In some implementations, the analytics content consumers 210, 212, 214 represent one or more enterprises (customers) that consume applications and analytics systems provided by the service provider 206 (e.g., SAP SE). In some examples, the analytics content consumers 210, 212, 214 each represent one or more application tenants each embedded with an analytics system tenant, as described herein. In accordance with implementations of the present disclosure, each of the analytics content consumers 210, 212, 214 receives analytics content from the ACN 202. For example, the analytics system tenant of each of the analytics content consumers 210, 212, 214 receives analytics content from the ACN 202. Although not depicted in FIG. 2, but as described in further detail herein, the analytics content is received from the ACN 202 through one or more application programming interfaces (APIs).

In the particular example shown in FIG. 2, each of the analytics content consumers 210, 212, 214 receives the public analytics content from the public analytics content store 220. For example, the public analytics content can include a dashboard provided by the service provider (e.g., SAP SE), the dashboard being made available to all consumers of an application (e.g., SAP SuccessFactors) having analytics embedded therein. In some examples, the public analytics content is provided on a pull basis. That is, for example, to receive the public analytics content, a consumer sends a call for the public analytics content to the ACN 202 (e.g., through an API).

In the example of FIG. 2, the consumer 210 and the consumer 212 each receive the restricted analytics content from the restricted analytics content store 222. In some examples, the restricted analytics content is restricted to particular consumers. For example, an OEM can restrict the restricted analytics content to its customers. In some examples, the restricted analytics content is provided on a pull basis and/or a push basis. For example, in a pull basis, to receive the restricted analytics content, a consumer sends a call for the restricted analytics content to the ACN 202 (e.g., through an API). As another example, in a push basis, the restricted analytics content is automatically sent to the consumers 210, 212. For example, the restricted analytics content can be automatically sent in response to an update of the restricted analytics content.

In the example of FIG. 2, the consumer 212 receives private analytics content from the private analytics content store 224 and the consumer 214 provides private analytics content to the private analytics content store 222. In some examples, each consumer can create their own analytics content as private analytics content, and can transport the private analytics content from one of their analytics system tenants to another one of their analytics system tenants. In the example of FIG. 2, the consumer 214 can be a first analytics system tenant of an enterprise and the consumer 212 can be a second analytics system tenant of the enterprise, the consumer 214 transporting private analytics content to the consumer 212 through the ACN 202.

Figure 3:
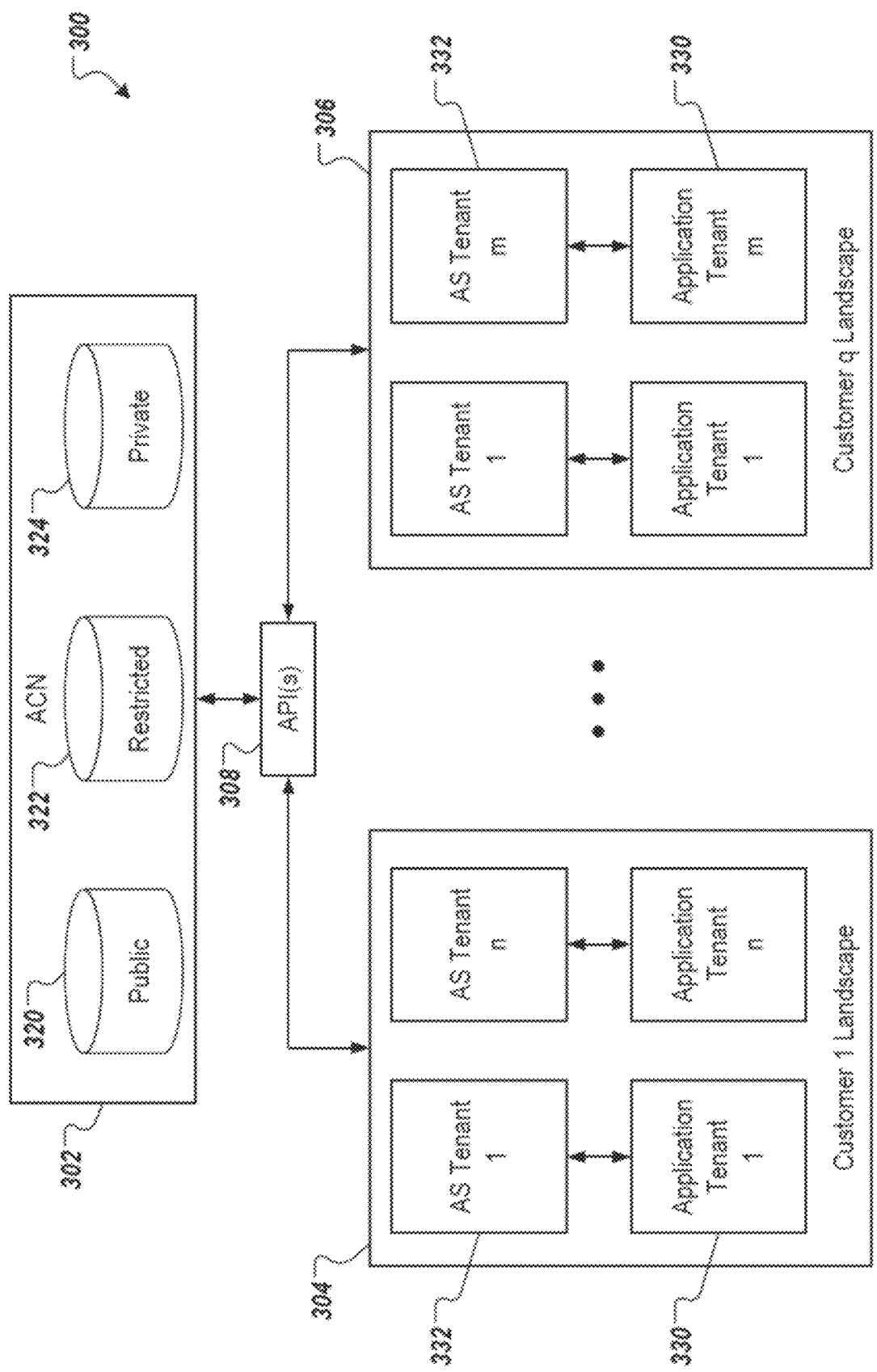
FIG. 3 depicts an example architecture in accordance with implementations of the present disclosure.

FIG. 3 depicts an example architecture 300. Here, the example architecture 300 includes an ACN 302, customer landscapes 304, 306, and one or more APIs 308 (e.g., REST APIs), through which the ACN 302 communicates with each of the customer landscapes 304, 306. In the depicted example, each of the customer landscapes 304, 306 includes one or more applications tenants 330 and respective analytics system tenants 332. In accordance with implementations of the present disclosure, and as described herein, each application tenant 330 is embedded with a respective analytics system tenant 332, which receives analytics content from the ACN 302. The ACN 302 includes a public analytics content store 320, a restricted analytics content store 322, and a private analytics content store 324, as similarly described above with reference to FIG. 2.

In accordance with implementations of the present disclosure, delivery of analytics content from the ACN 302 to one or more of the analytics system tenants 332 is automatically executed. For example, at provisioning of an analytics system tenant 332, analytics content that is relevant to the particular analytics system tenant 332 and/or customer is provided from the ACN 302. Automated provisioning of the analytics content enables time- and resource-efficient distribution of the analytics content, particularly in the case of 10s, 100s, or 1000s of tenants. In some examples, different tenants receive different analytics content. For example, an application tenant 330 of the customer landscape 304 can execute a first application (e.g., SAP SuccessFactors) that is embedded with the analytics system through the analytics system tenant 332 and receives first analytics content that is relevant to the first application (e.g., a HR dashboard for displaying analytical data, such as, recruitment KPI values, requisitions, positions, recruitment process analysis, and talent pipeline). As another example, an application tenant 330 of the customer landscape 306 can execute a second application (e.g., SAP CRM) that is embedded with the analytics system through the analytics system tenant 332, and receives second analytics content that is relevant to the second application (e.g., a CRM dashboard displaying analytical data, such as, growth, pipeline, sales team performance, target planning, and quota planning) In some examples, the analytics content that is to be sent to an analytics system tenant can be determined based on a universally unique identifier (UUID) that uniquely identifies the analytics system tenant among multiple analytics system tenants.

In some implementations, multiple types of analytics content delivery into tenants are provided, and can range from simple to advanced. Example types include, without limitation, manual analytics content delivery, automated-simple analytics content delivery (also referred to herein as light-embedding), and automated-advanced analytics content delivery (also referred to herein as deep-embedding).

In some examples, manual analytics content delivery refers to scenarios, in which a user (e.g., an agent/employee of a customer) of an application manually requests analytics content. For example, the user can open a content library using a UI of the application and can select one or more content packages. In response, a request is submitted to the ACN 302 through the API(s) 308 to import the analytics content and use the analytics content within the application. The manual analytics content delivery is typically used in case where an application has few tenants.

In some examples, in light-embedding, content packages are deployed through a tenant configuration API (TC-API), which is provided as one of the APIs 308. In some examples, the TC-API provides for tenant configuration. For example, upon initiation of an analytics system tenant, a call can be made through the TC-API for a configuration file that is used to configure the analytics system tenant:
(e.g., https://api.analytics.system/oem//tenants/<AS_tenant uuid>/config).

For example, the call identifies a particular tenant using a UUID assigned to the tenant and requests computer-executable configuration instructions (config). In some examples, one of the configurations is "ACN content import" (e.g., "SetAcnPackage" in the API payload). In some examples, the particular analytics content can be determined based on the UUID of the tenant. For example, the UUID can be mapped to one or more analytics content, which is then provided in a content package to be included in the API payload sent in response to the configuration request. In this manner, the content package (containing the analytics content that is to be delivered to the analytics system tenant) is provided in the API payload that is transmitted to the analytics system tenant.

In some examples, authentication is provided using API keys. For example, each analytics system tenant includes an API key that is provided with the API call and authenticates the analytics system tenant for receipt of the content package(s). The API key can include an encrypted value that the API can use to authenticate the source of the API call (i.e., the tenant).

In some examples, in deep-embedding, content packages are deployed through a set of analytics system tenant content import/export APIs, which are provided in the APIs 308. In some examples, deep-embedding is used in scenarios where content packages are managed by respective development teams. For example, for some analytics content, creation is not a one-time task. Instead, the analytics content can undergo continuous or periodic development.

So-called hotfix processes are automatically executed to update the analytics content in respective tenants. By way of non-limiting example, a dashboard can be considered. An initial release of the dashboard can be provided as analytics content. However, the development team that provided the dashboard can revise (update) the dashboard. The updated dashboard can be released to the ACN 302 as analytics content, and the ACN 302 can distribute the updated dashboard to appropriate customers (e.g., all customers, if the dashboard is public; select customers, if the dashboard is restricted).

In some implementations, the APIs 308 include an export API and an import API that can be called based on uniform resource locators (URLs) of respective analytics system tenants (e.g., https://<AS_tenant URL>/api/v1/content/jobs) and which respectively enable for export/import of content packages. In some examples, import refers to downloading content from the ACN to an analytics system tenant, and export refers to uploading content to the ACN from an analytics system tenant. In some examples, the export API accepts a list of content items as input and can collect any dependent data objects to create a content package. By way of non-limiting example, in an api/v1/content/jobs endpoint, a type parameter is included and is set to EXPORT or IMPORT. During an export API call, identifiers assigned to respective content (e.g., stories, models) present in the current tenant (source tenant) are set to be exported. All of the content specified, and any dependencies, are exported to the ACN as a new package in a background job. During an import call, the content present inside an ACN package is imported into the target tenant.

In some examples, each of the import API and the export API operates asynchronously. For example, a first call triggers import/export and a "job id" is returned, which can be used to poll for the status of the import/export job. After some time (e.g., seconds, minutes), the job is finished and the analytics content is imported/exported. In some examples, authentication is provided using authentication clients. For example, the open authentication (OAuth) protocol can be used for the authentication process. In some examples, authentication is performed using OAuth clients and a client credentials flow. In some examples, OAuth clients are created locally to a tenant (e.g., as part of the configuration of the tenant using the TC-API, described above). Consequently, these APIs are typically called from an application tenant, which can connect to its associated analytics system tenant.

The granting of access rights to analytics content by the ACN is now discussed. Various use cases are possible.

A first use case can have a single root level folder to which publishers can export private content. All authorized publishers can export content to this category Under a second use case, a user on an importing tenant can view content to which he is granted access. This will be determined based on the tenants specified by the publisher while exporting content to the content network.

According to a third use case, customers can also choose to export content to sub-categories/folders within a single category meant for sharing content privately.

In a fourth use case, users who are authorized to publish content can also create sub-categories/folders under it to publish content. Users should be able to create folders in the following workflows:

go to the content network and create a folder at a particular level within it, -orcreate a folder into which a package will be published, while in the publish workflow.

In the publish workflow, users will only see folders and packages into which they can publish content. Others should be hidden from their view.

We should be able to manage duplicate folders created by users. If a user creates a duplicate sub-category/folder at the same level as another sub-category/folder (which is visible to the user) with the same name, we will ask for a confirmation. If the user still wants to go ahead, we will create a duplicate one (since it is anyways supported when two different publishers create a folder at the same level, without being aware of the existence of another folder with the same name).

If another sub-category/folder with the same name exists but it not visible to the publisher, this information will not be shared with the publisher and he can create a duplicate. Internally we will identify these with unique IDs.

In certain cases, the analytics content may exhibit a hierarchical structure, with access rights tailored to that hierarchy. A number of possible use cases are now discussed in connection with FIGS. 5-18C.

The following use cases highlight rights on any package/sub-category (SB) based on user actions. Access rights are given by the Owner tenant (OT) to target tenants T1, T2 . . . .

Various possible access rights are L (list), R (Read), W (Write/modify), D (delete). The OT has all rights explicitly by default on all created packages/sub-categories. The level number (e.g., SB_) is the level of package/folder in ACN.

Figure 5:
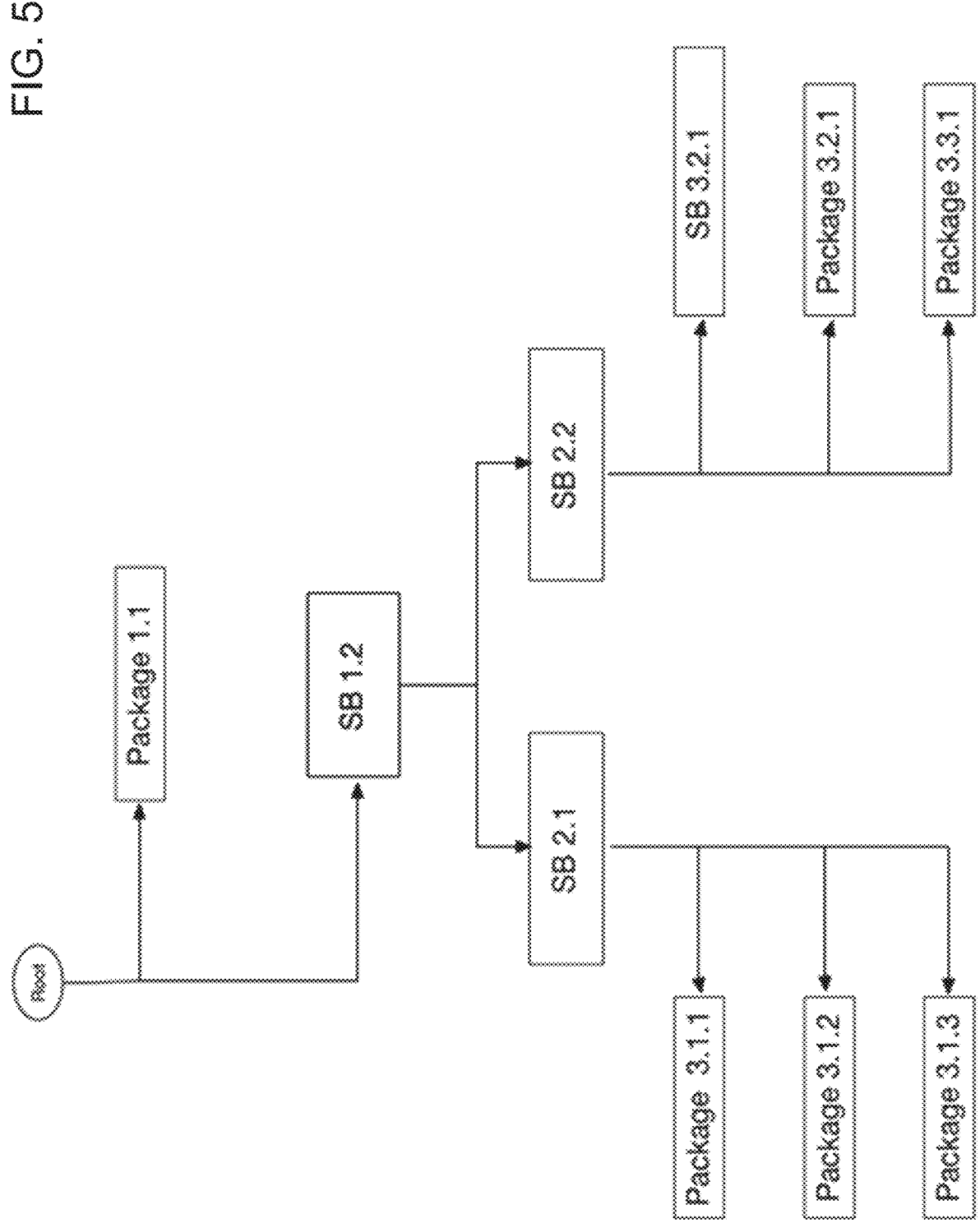
FIG. 5 shows a simplified diagram illustrating a background for a variety of use cases.

FIG. 5 shows a simplified diagram illustrating a background for a variety of specific use cases. Here, the OT has created these packages and sub-categories in their "My Content" private space.

In a first specific use case, the OT grants tenant T1 Read, Write rights to SB 1.2. That tenant OT receives a prompt asking:

"Do you want to over-ride any explicit rights given to sub-categories or packages inside this folder?"

Figure 6:
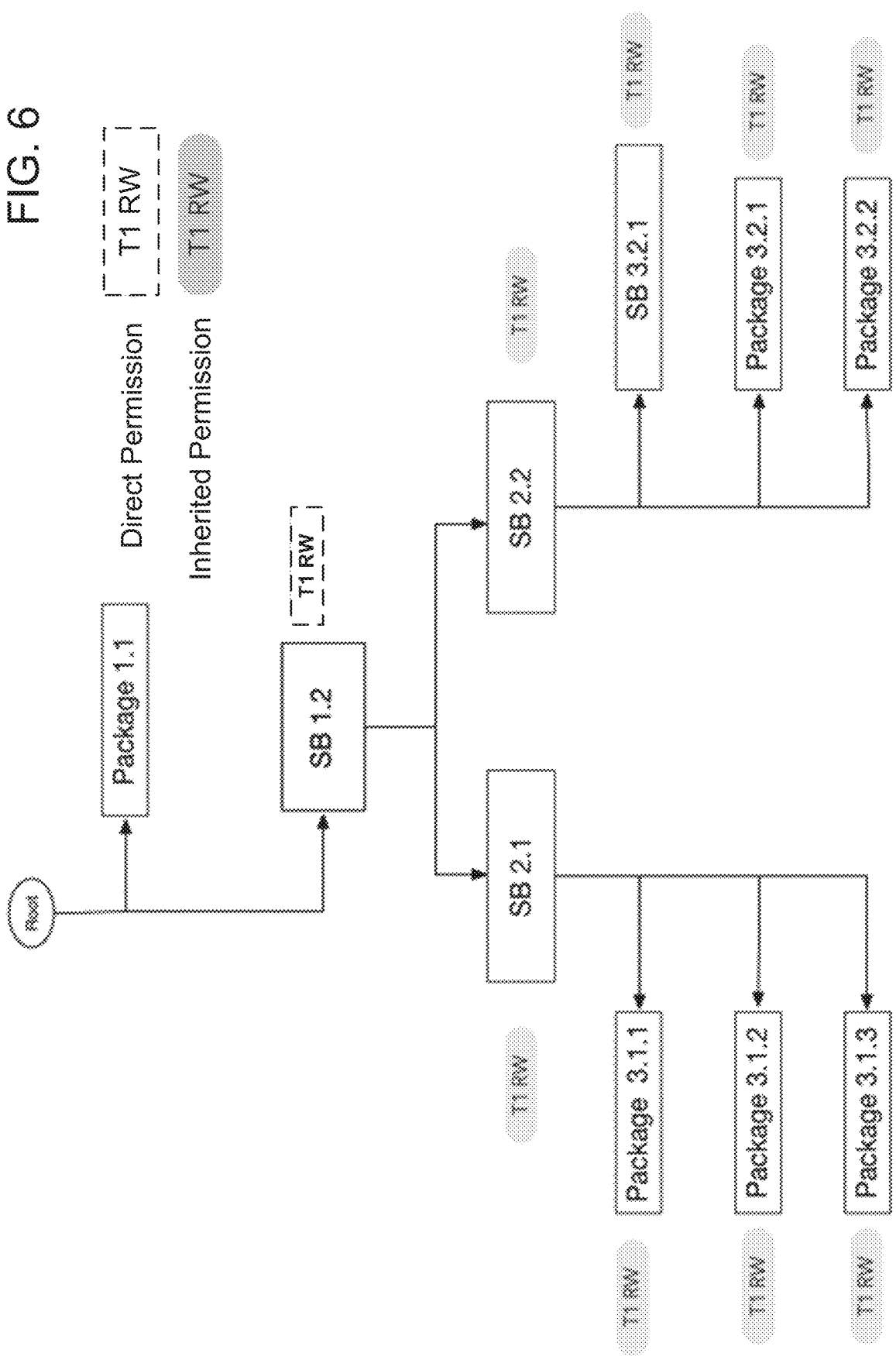
FIG. 6 is a simplified diagram illustrating a first use case.

Irrespective of the OT choosing YES/NO, as shown in FIG. 6 there was no explicit right given on any package or sub-category. The T1 listing—sees SB 1.2 at root and its children for Import and Export.

Figure 7:
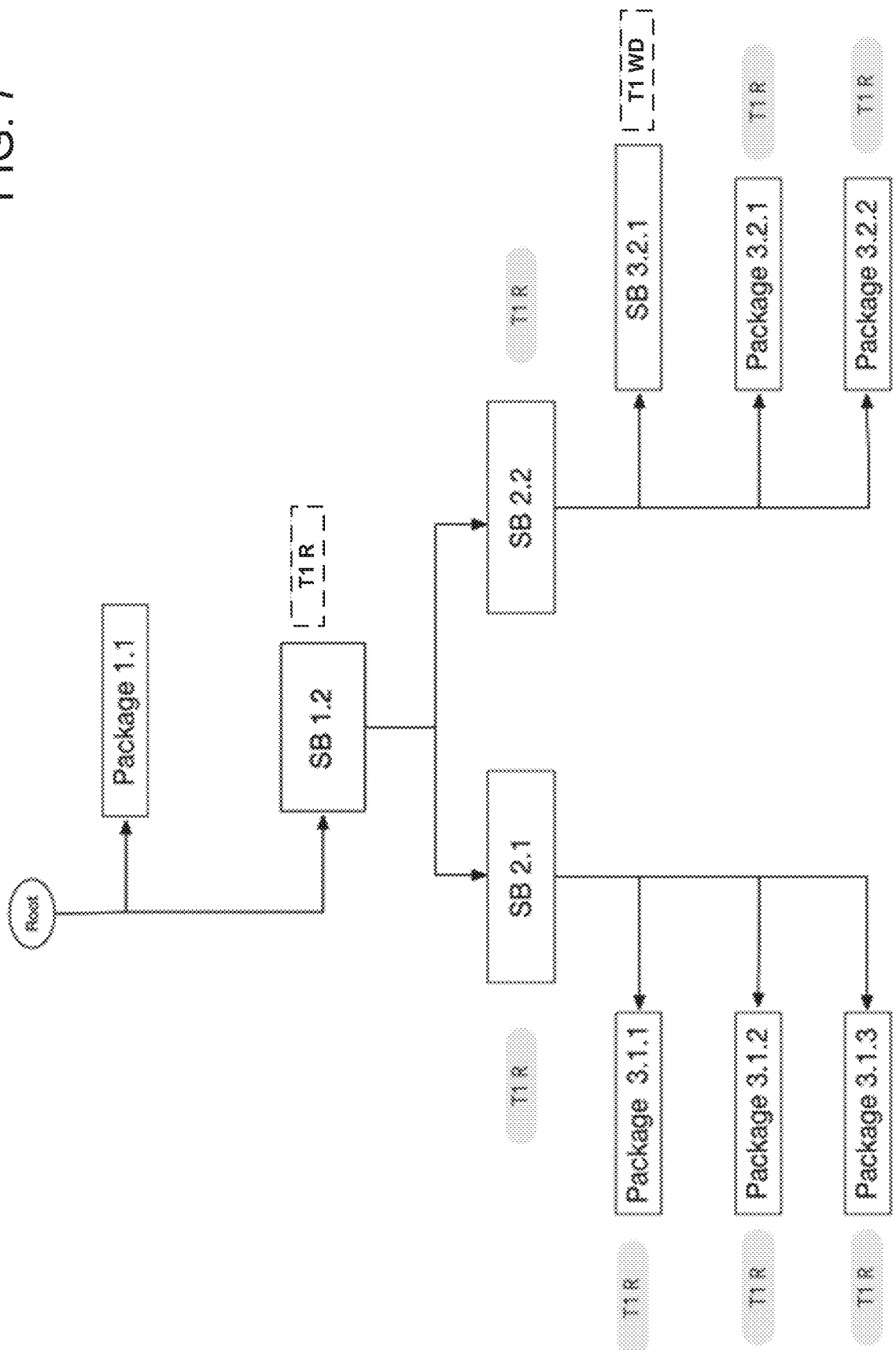
FIG. 7 illustrates a second use case.

FIG. 7 illustrates a second use case. The OT grants tenant T1 Write and Delete access rights on SB 3.2.1, and the Read access right on SB 1.2.

When the prompt comes up, OT chooses NO. As a result, the tenant T1 sees SB 1.2 and its children for Import. The tenant T1 sees SB 3.2.1 at root level for Export.

Figure 8:
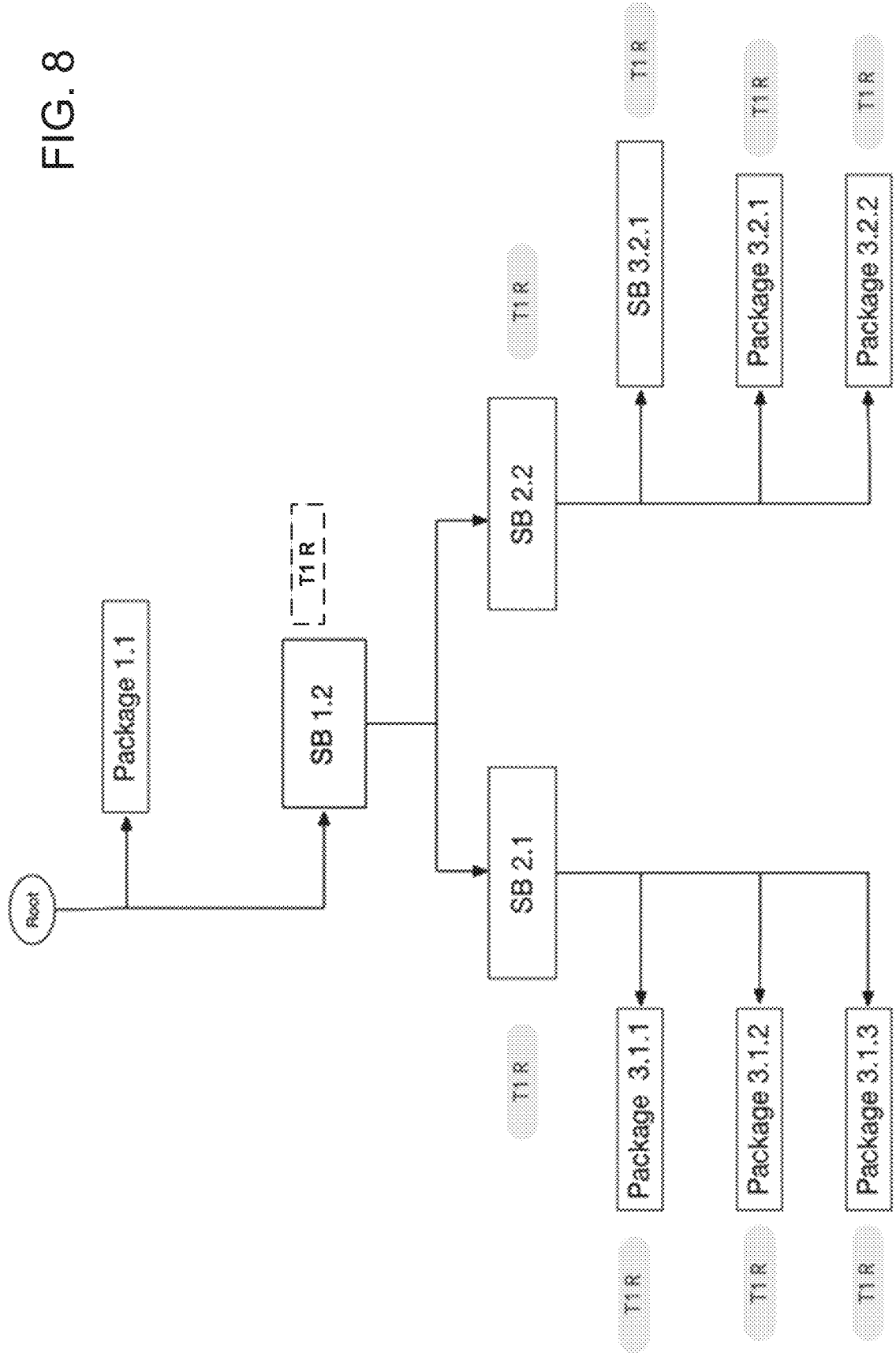
FIG. 8 is a simplified diagram illustrating a third possible use case.

FIG. 8 is a simplified diagram illustrating a third possible use case. Here, the OT grants tenant T1 Write and Delete access rights on SB 3.2.1, Read access rights on SB 1.2.

When the prompt comes up, they choose YES. As a result, tenant T1 sees SB 1.2 and its children for Import. The tenant T1 sees nothing for Export.

Figure 9:
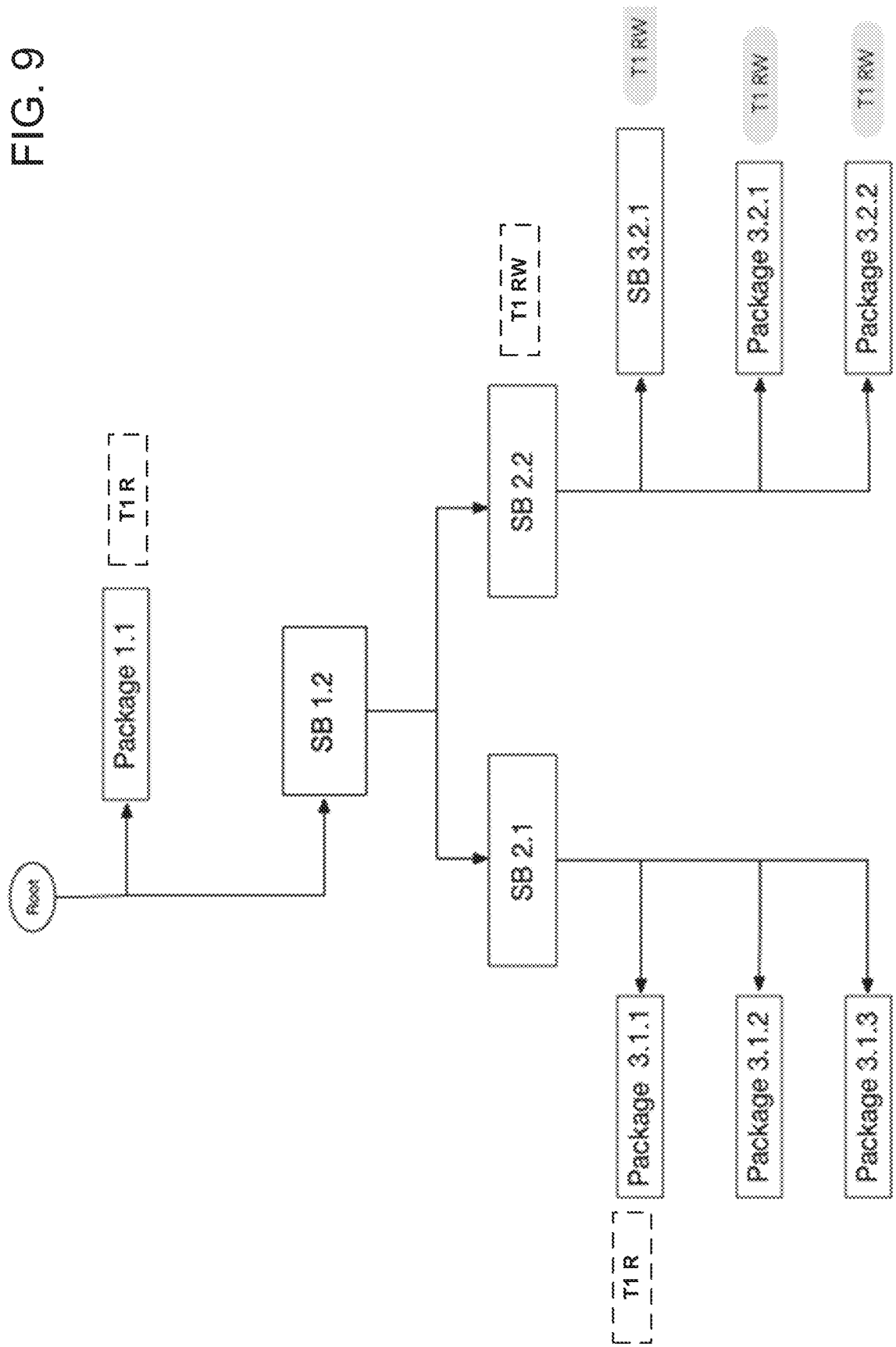
FIG. 9 is a simplified illustration of a fourth possible use case.
Figure 11:
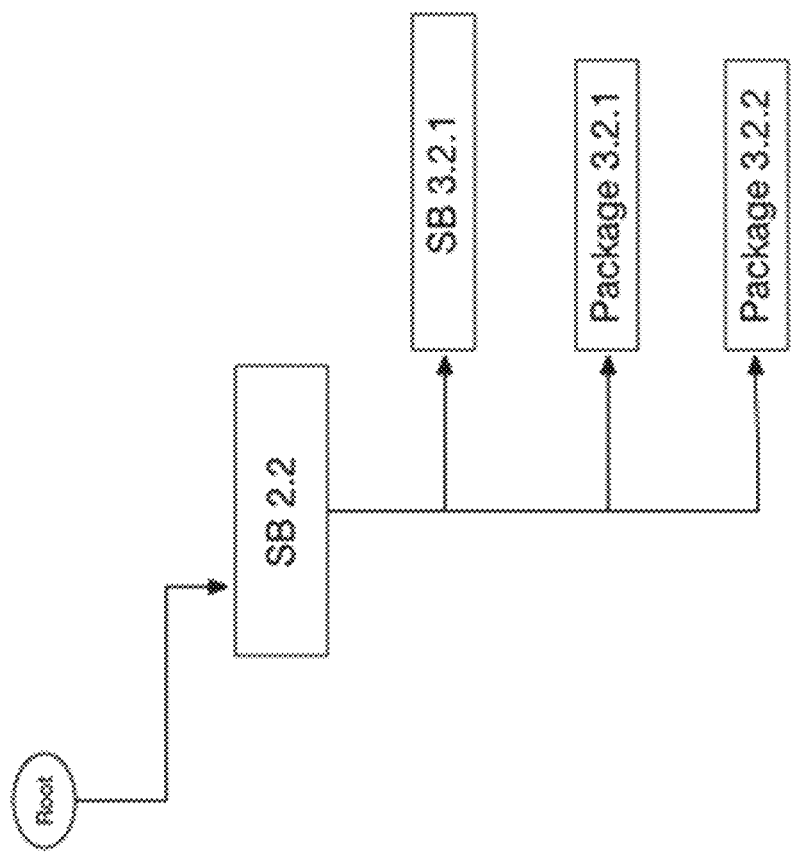
FIG. 11 shows an export structure.

FIG. 9 is a simplified illustration of a fourth possible use case. Here, the OT grants to the tenant T1:

Read access rights on Package 1.1,

Read access rights on Package 3.1.1, and

Read, Write access rights on SB 2.2 with overwrite YES/NO.

Figure 10:
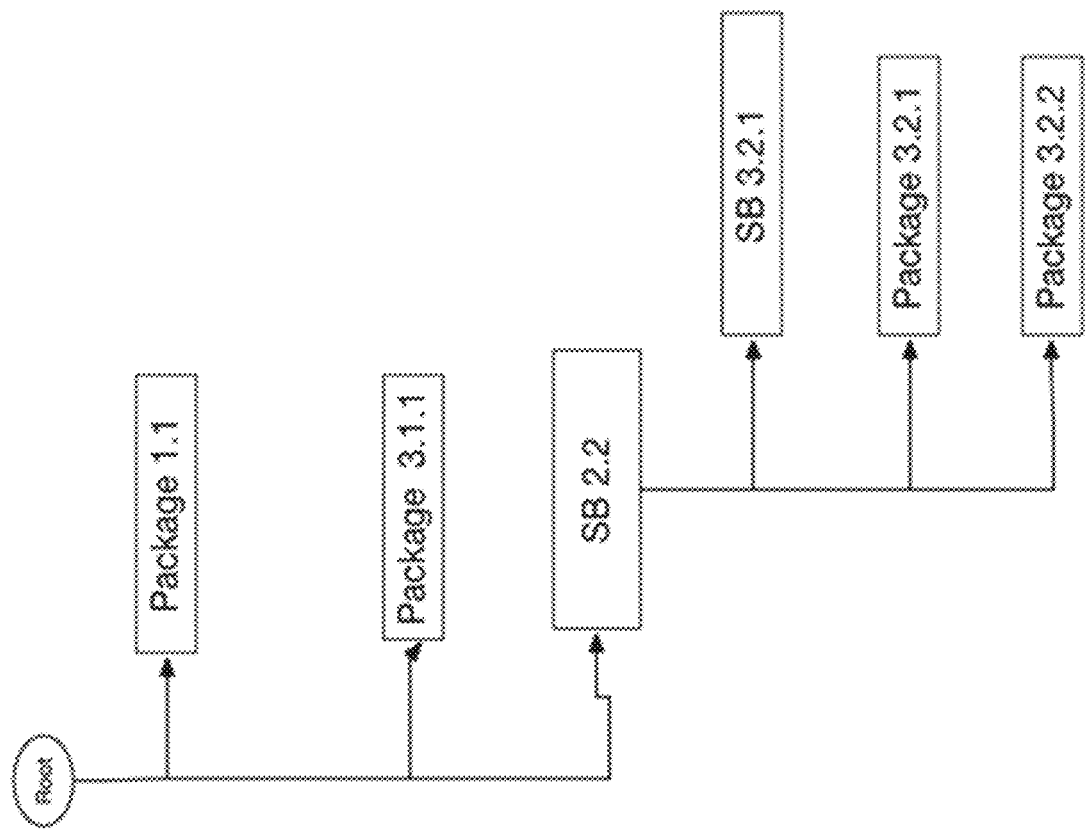
FIG. 10 shows an import structure.

As a result, the tenant T1 sees the Import Structure of FIG. 10. The tenant T1 sees the Export Structure of FIG. 11.

Figure 12:
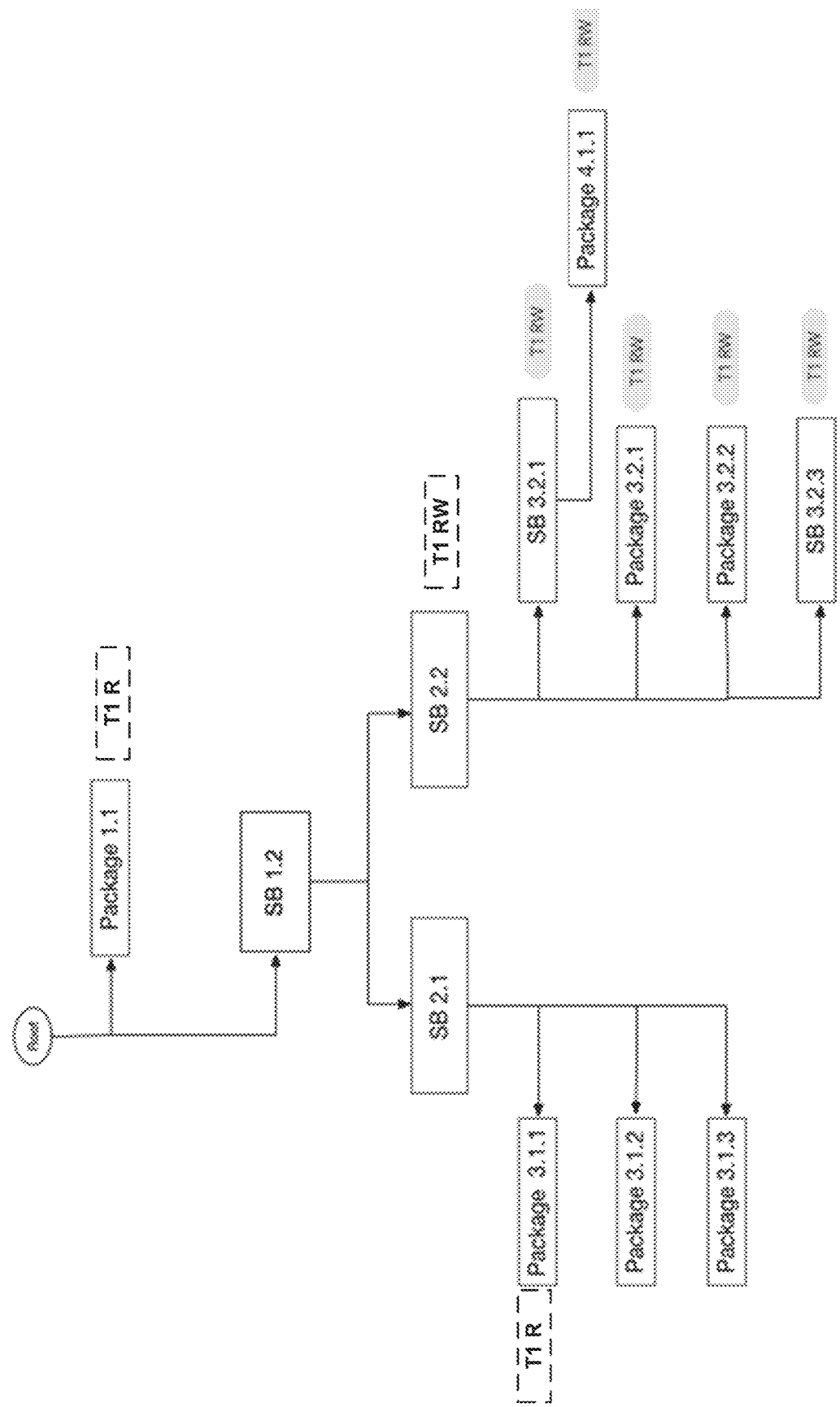
FIG. 12 illustrates a fifth possible use case.

FIG. 12 illustrates a fifth use case. After the fourth use case 4 (shown in FIGS. 9-11), the OT adds a new subcategory SB 3.2.3, and a new package 4.1.1 under SB 3.2.1.

Figures 13, 14:
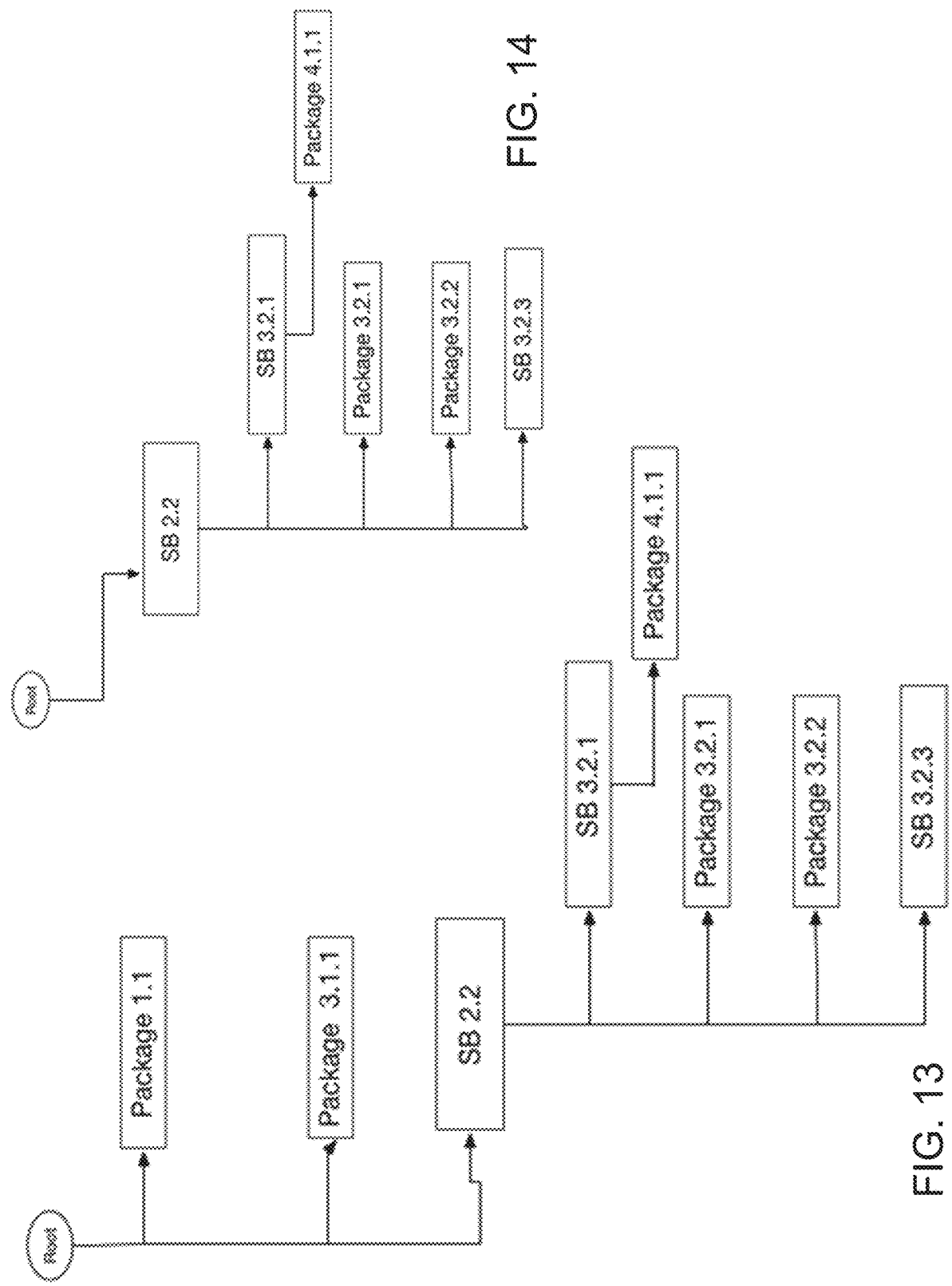
FIG. 13 shows an import structure.
FIG. 14 shows an export structure.

As a result, the tenant T1 sees the Import Structure of FIG. 13. The tenant T1 sees the Export Structure of FIG. 14.

Figure 15:
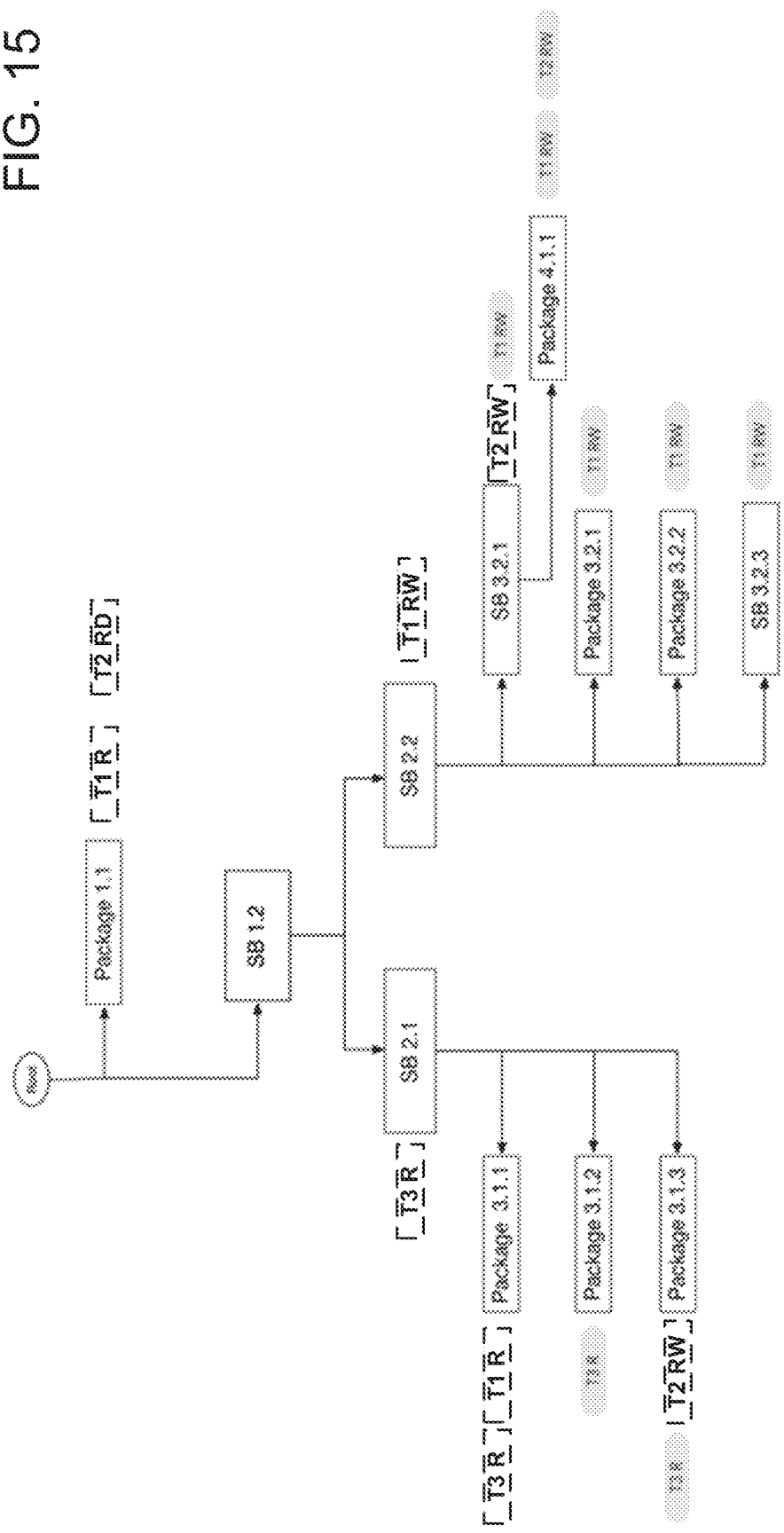
FIG. 15 is a simplified diagram illustrating a use case involving multiple tenants.
Figures 16, 17:
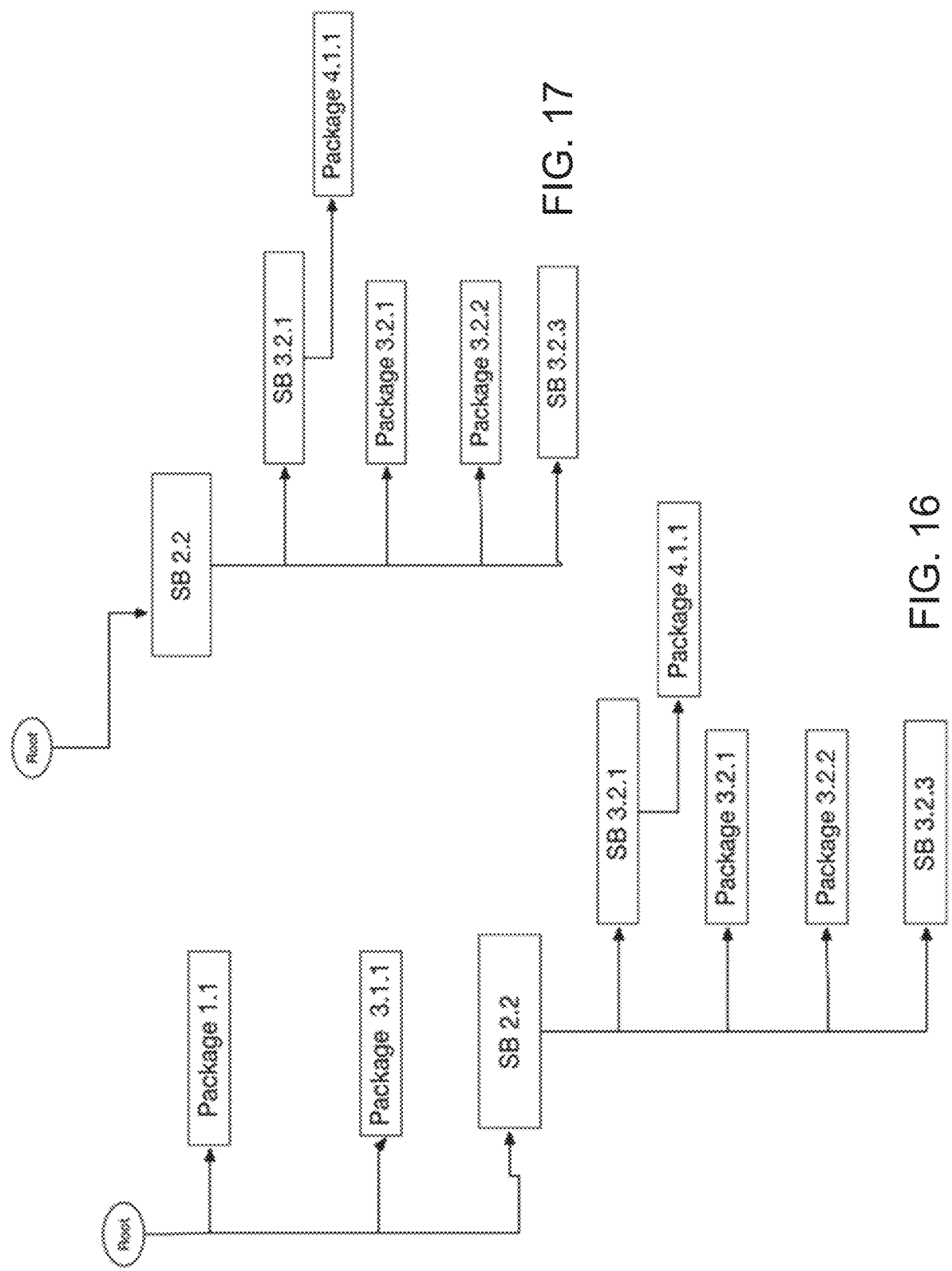
FIG. 16 shows an Import Structure visible by a first tenant.
FIG. 17 shows an export structure visible by the first tenant.

The simplified diagram of FIG. 15 shows a use case involving the granting of rights to multiple tenants, as operating in a similar manner, e.g.:

Tenant T1 sees the Import Structure of FIG. 16, and the Export Structure of FIG. 17.

Tenant T2 sees the Import Structure of FIG. 18A, and sees the Export Structure of FIG. 18B.

Figure 18C:
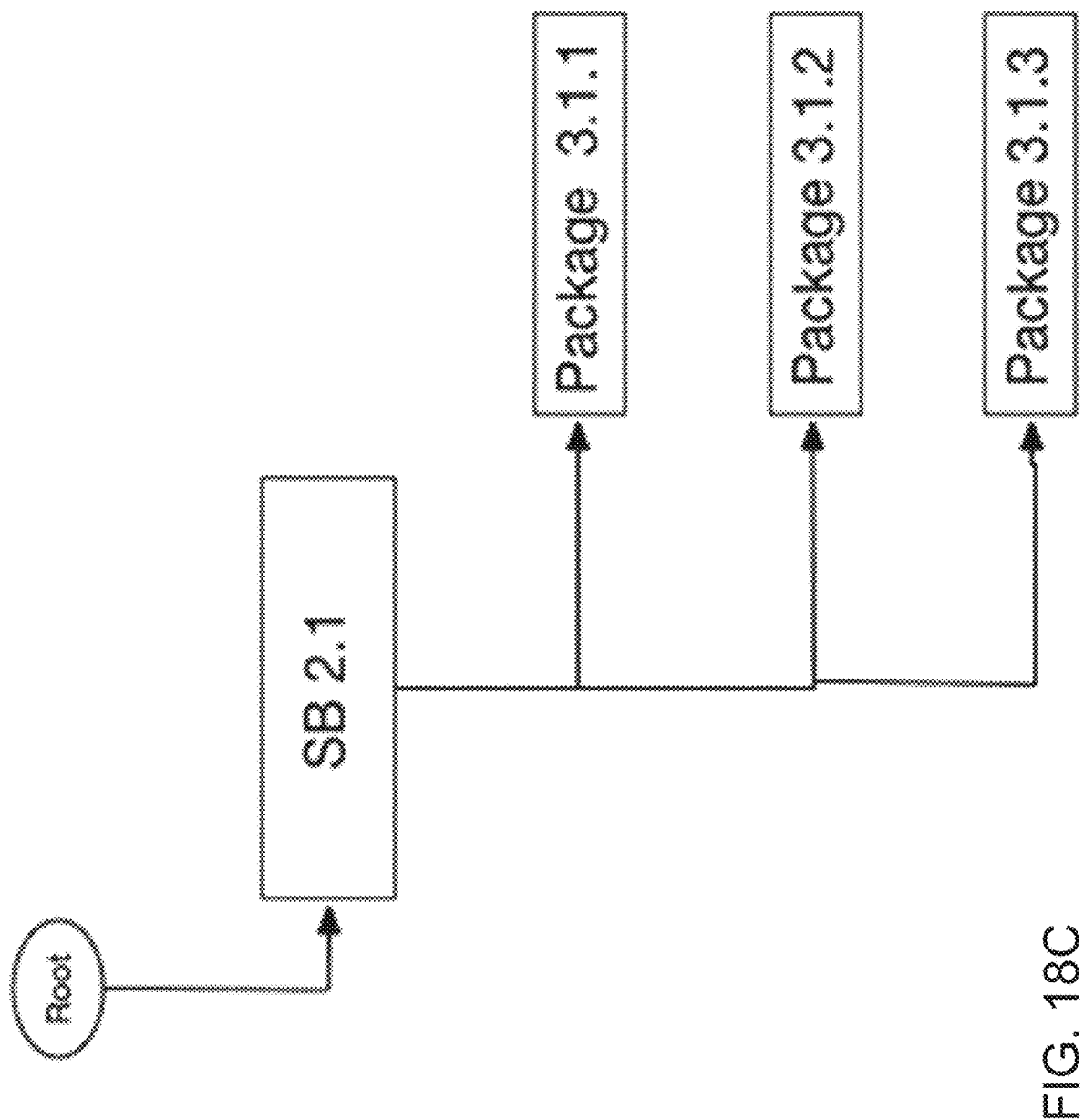
FIG. 18C shows an import structure visible by a third tenant.

Tenant T3 sees the Import Structure of FIG. 18C. Tenant T3 sees an empty Export Structure.

The presentation of items in a flat data structure in a relational database may offer some technical issues. That is, representing a hierarchical structure itself poses a challenge in the world of relational databases.

Things become even more complex where the items are represented as a flat data structure (such as an adjacency list). That is, for any given item you have information only about the parent item.

Such a flat configuration offers no easy way to find all ancestors or descendants for an item. Rather, recursively checking in upward/backward direction may be required.

In such an implementation, whenever we want check access for an item we would have to check if access is available at the item level first. If not, then we will check to determine if access is available at parent level and so on all the way up to the root level.

Figure 19:
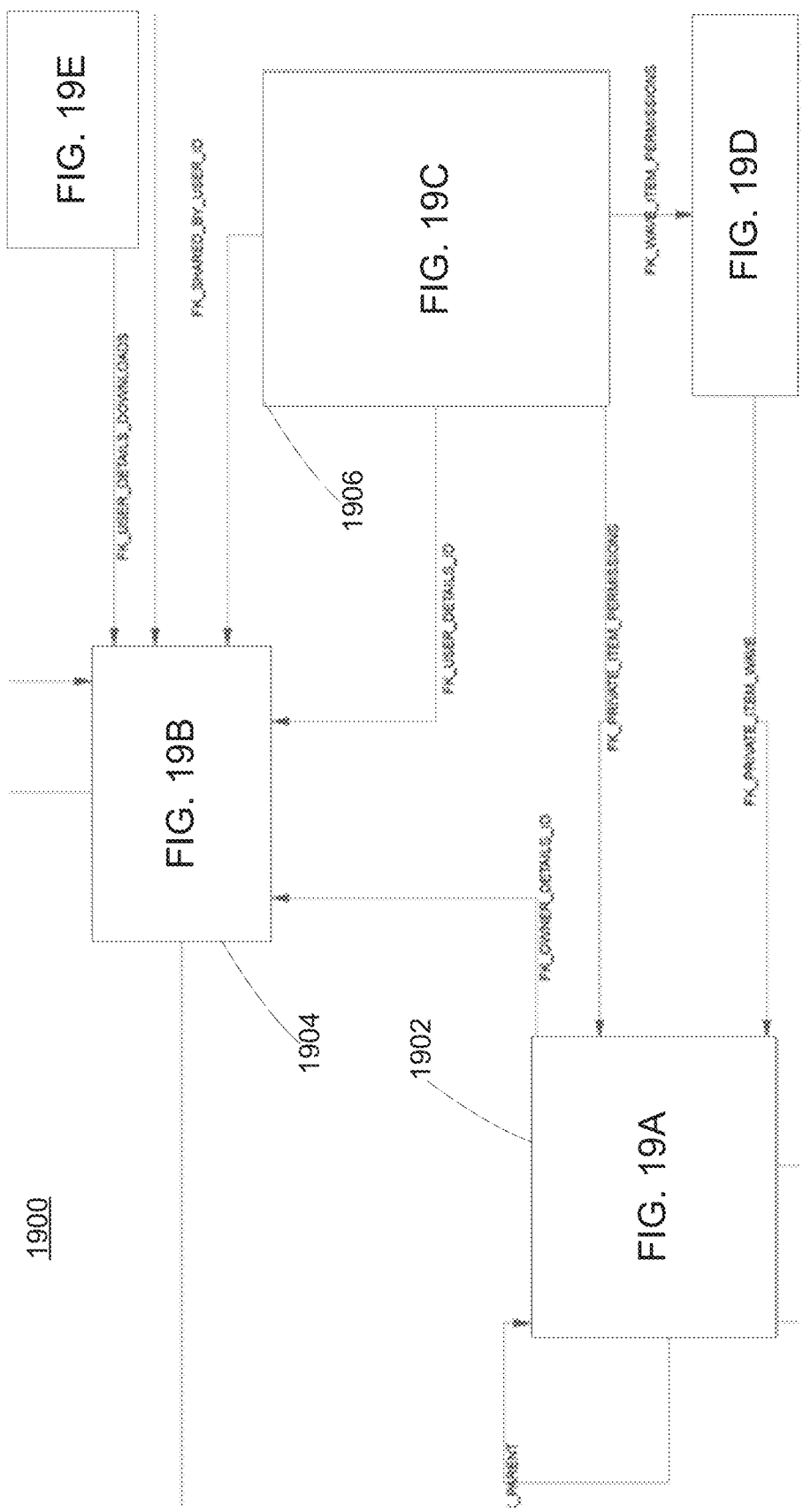
FIG. 19 shows a structure of a database schema according to an example.

As a possible solution to such a time-consuming approach, consider a database schema having a structure 1900 as in FIG. 19. A least the following three tables are shown:
- •private_items 1902 (FIG. 19A);
- •tenant_users_details 1904 (FIG. 19B); and
- •permissions table 1906 (FIG. 19C).

Here, the •private_items table stores items' related metadata. The table •tenant_users_details stores user related metadata. The •permissions table stores access control data like: which item is accessible to what user.

Figure 20:
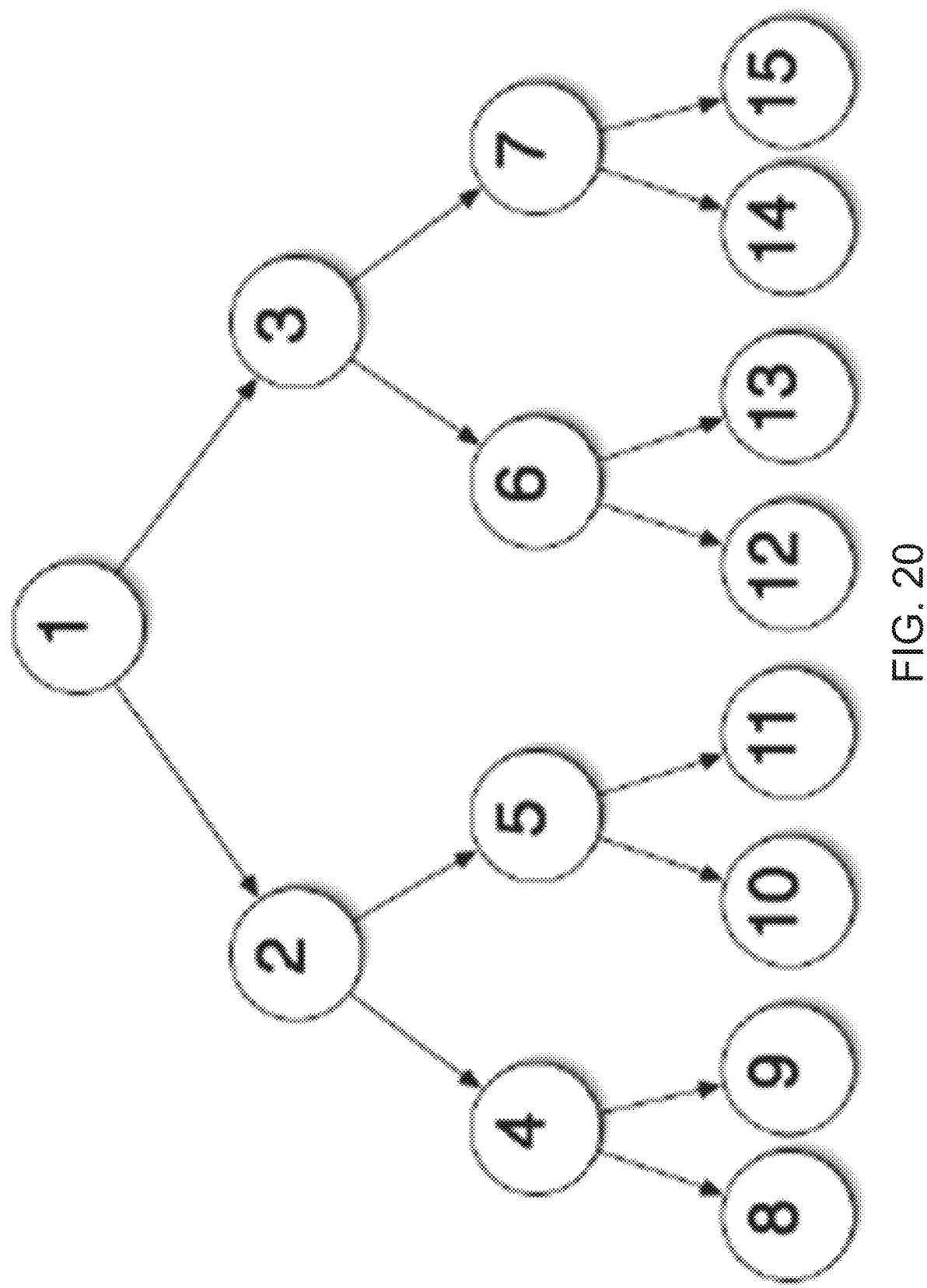
FIG. 20 shows a simplified example of a tree structure.

Now, prior to discussing possible solution(s) addressing support of access inheritance, consider the tree structure of FIG. 20. In particular, FIG. 20 shows an exemplary hierarchical structure of the items that can be represented.

Each non-leaf node represents the Folder, and the leaf node may be a Folder/Package. Here, the level in the nodes represents IDs of the item (item_id as per the schema table taken as a reference).

There could be multiple ways to address the issues discussed above. One possible approach to resolve the recursion problem and support inheritance, is by storing redundant information in the permissions table. For example, if a user has access to a folder, then entries in permissions table may be replicated for all sub-folders and files as well.

Thus if a given user with user_details_id=1 has access to _item_id=3, then in the permissions table we could make multiple entries to build this knowledge. The following shows table redundancy if there is entry for all the inherited permissions.

| item_id | access_given_to_user_id |
| --- | --- |
| 3 | 1 |
| 6 | 1 |
| 7 | 1 |
| 12 | 1 |
| 13 | 1 |
| 14 | 1 |
| 15 | 1 |

This proposed solution would work, and avoids recursion whenever we want to check for access to a given item. However, a lot of redundant information is being stored.

However, storage is not the only concern here. Relying upon redundant information for access verification can render the application logic too complex and degrade performance. For example, whenever a new item will be created under a parent folder, we would have to make an entry for all the users' that had access to the folder, and associate them with the new item as well. Then, only the users will get access to the item.

Similarly, deletion of items and revoking of access also becomes complex, and performance may be degraded.

To avoid these issues, it is noted that the user's being granted access to all children of item_id=3, could have been expressed built by just storing the following single entry:

| item_id | access_given_to_user_id |
| --- | --- |
| 3 | 1 |

This shows entry only for the direct permission

By making just this one entry, we optimize the amount of storage used. And, the workflows (e.g., addition of new item, deletion of an item, revoking of access) becomes less complex and offers improved performance.

The issue of how application logic could resolve access to any item at any level in the tree for a given user, is now discussed.

In the relational database the hierarchy information is stored in flat manner as explained before. Thus, embodiments may build an effective permitted tree structure for a user as follows.

The effective tree structure for the permitted items can be built taking into consideration:
a) permission types (view, read, write, delete)
b) Item types (just the folder hierarchy or the content entity (package)
c) Parent.

The effective structure can be used in a variety of different purposes. One purpose allows filtering the permitted structure based on access type:
1) The permitted tree structure for view access can be used for giving the info for available packages.
2) The permitted tree structure for read access can be used in the workflow of importing the content.
3) The permitted tree structure for write access can be used in the workflow of managing the content.

Another purpose for the effective structure is filtering the permitted structure based upon item type:
1) With itemType "FOLDER", only the permitted folder hierarchy can be fetched that can be used for showing the location in the content sharing or publishing workflow.
2) With itemType "PACKAGE" (content entity) the effective structure of the packages at multi level that can be used for name collison check while publishing the content.

Still another purpose for the effective structure is to obtain the permitted item List under a parent folder:
1) With a valid folder id the immediate permitted children can be fetched.
2) The whole structure can be fetched considering using the parent folder id (special case)

A sample procedure for accomplishing this goal is now described. In particular Inputs 1. and 2. are used.
1. The direct permission entries for the items for a user—Array<Permission>Permission {
View: boolean
read: boolean,
write: boolean,
delete: boolean
}

2. The all items array the flat structures having the item details and parent item information—Array<Item>
Item {
itemId: Long,
parentItemId: Long,
itemDetails: {details of the item like content, item metadata etc.}
}

The output is the effective permitted tree structure of the items—HashMap<ItemId, List<Item>>.

A procedure for determining the effective permitted structure is now described. In particular, we can think of the whole tree (without permission) as a forest where each node represents an item.

A first step is to find the nearest ancestor with permission of items recursively starting from the items having explicit permission entries. It is required to decide the parent in the effective permitted items tree. The nearest ancestor should be null if for an item, no ancestor with direct permission is found. As an example, if the user has permission for an item but does not have permission for any of the ancestors, the item should be structured for his permitted structure of item. The user should not get the permission for the actual folder hierarchy information in this case.

A second step is to maintain a hash of the visited items to the found nearest ancestor with permission. Thus in the upward traversal finding an ancestor for which the traversal has been already done, the ancestorWithPermission becomes the ancestorWithPermission of the visited node. In this manner, no node is visited more than twice. And, the traversing the above part of the tree (starting from the nodes with direct permissions) will be in O(n) in worst case and O(m) in average case—where n and m denote the number of all items and number of permitted items, respectively.

A next step is to add the descendants' items (that the user has inherited permissions), recursively in the effective permitted tree. This is the downward traversal of the tree, and can be achieved starting from the items/nodes with direct permission. This step also traverses all the nodes at most once. Hence complexity of the traversal will be O(m) where m denotes the number of permitted items.

Lastly, as we are starting with the nodes having direct permissions, the branches that the user doesn't have permission for are avoided during the traversal. This reduces the overall complexity of the traversal.

So, the overall complexity to build the effective permitted items' tree will be O(n) in a worst case, and O(m) in an average case. Here, n and m respective denote the number of all items and the number of permitted items.

Consider the example described previously, and further suppose a user has direct permission for item 3 and 11.

| Item_id | Access_given_to_user_id |
|---------|------------------------|
| 3 | 1 |
| 11 | 1 |

The effective permitted structure for the user will be as below—
 The item node 11 will be at root and the user has the direct permission for the item but not any of the ancestor items.
 The subtree rooted at item 3, as user will have the inherited permissions for all the descendant items of item 3.

Now this can be achieved using the procedure mentioned before.
 In the first step of finding the nearest ancestor starting from the items(3,11) with direct permissions—
  a. The nearestAncestorWithPermission of item 3 will be null.
  b. The nearestAncestorWithPermission of item 11 will be null.
 In the step of recursively filling the inherited permissions for the folder, the whole subtree of item 3 will be added starting from 3→[6, 7], 6→[12, 13], 7→[14,15]
 As there is no direct permission for any of them items in the branch rooted at 2, the traversal of the items in the branch is avoided.

Returning now to FIG. 1, that shows the effective permitted structure as exhibiting a tree hierarchy. However, that is not required, and the effective permitted structure could be adopt a different hierarchical organization—a star schema for example.

Moreover, the particular embodiment in FIG. 1 shows the engine responsible for implementing access control as being located outside of the database. However, this is also not required.

Rather, alternative embodiments could leverage the processing power of an in-memory database engine (e.g., the in-memory database engine of the HANA in-memory database available from SAP SE), in order to perform various functions.

Figure 21:
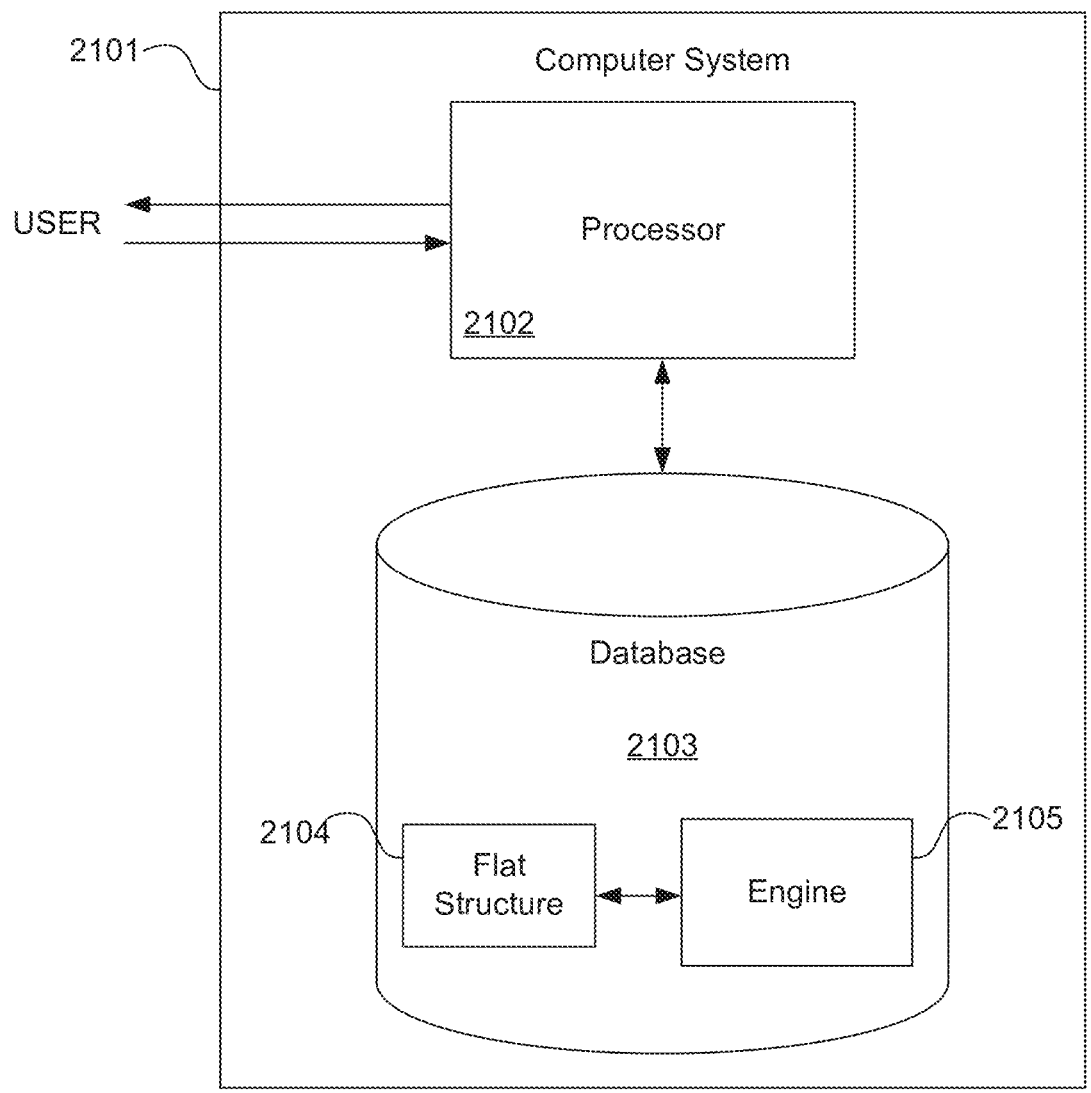
FIG. 21 illustrates hardware of a special purpose computing machine according to an embodiment that is configured to implement access control.

Thus FIG. 21 illustrates hardware of a special purpose computing machine configured to implement access control according to an embodiment. In particular, computer system 2101 comprises a processor 2102 that is in electronic communication with a non-transitory computer-readable storage medium comprising a database 2103. This computer-readable storage medium has stored thereon code 2105 corresponding to an engine. Code 2104 corresponds to a flat data structure (such as an adjacency list). Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

An example computer system 2200 is illustrated in FIG. 22. Computer system 2210 includes a bus 2205 or other communication mechanism for communicating information, and a processor 2201 coupled with bus 2205 for processing information. Computer system 2210 also includes a memory 2202 coupled to bus 2205 for storing information and instructions to be executed by processor 2201, including information and instructions for performing the techniques described above, for example. This memory may also be used for storing variables or other intermediate information during execution of instructions to be executed by processor 2201. Possible implementations of this memory may be, but are not limited to, random access memory (RAM), read only memory (ROM), or both. A storage device 2203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2203 may include source code, binary code, or software files for performing the techniques above, for example. Storage device and memory are both examples of computer readable mediums.

Computer system 2210 may be coupled via bus 2205 to a display 2212, such as a cathode ray tube (CRT) or liquid crystal display (LCD), for displaying information to a computer user. An input device 2211 such as a keyboard and/or mouse is coupled to bus 2205 for communicating information and command selections from the user to processor 2201. The combination of these components allows the user to communicate with the system. In some systems, bus 2205 may be divided into multiple specialized buses.

Computer system 2210 also includes a network interface 2204 coupled with bus 2205. Network interface 2204 may provide two-way data communication between computer system 2210 and the local network 2220. The network interface 2204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 2204 sends and receives electrical, electromagnetic, or optical signals that carry digital data streams representing various types of information.

Computer system 2210 can send and receive information, including messages or other interface actions, through the network interface 604 across a local network 2220, an Intranet, or the Internet 2230. For a local network, computer system 2210 may communicate with a plurality of other computer machines, such as server 2215. Accordingly, computer system 2210 and server computer systems represented by server 2215 may form a cloud computing network, which may be programmed with processes described herein. In the Internet example, software components or services may reside on multiple different computer systems 2210 or servers 2231-2235 across the network. The processes described above may be implemented on one or more servers, for example. A server 2231 may transmit actions or messages from one component, through Internet 2230, local network 2220, and network interface 2204 to a component on computer system 2210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving as a first input, a flat data structure comprising a plurality of items and respective item details;
   receiving as a second input, permissions for direct access rights by a plurality of users to the plurality of items;
   recursively processing the first input and the second input to find nearest ancestors having the direct access rights;
   maintaining a hash to including the nearest ancestors;
   generating an effective permitted structure by recursively adding descendant items having inherited access rights, to the nearest ancestors;
   storing the effective permitted structure in a database; and
   distributing a descendant item privately to a user with an access right according to the effective permitted structure,
   wherein maintaining the hash limits the recursive processing of the first input and the second input such that traversing of ancestor items is O(n) in a worst case, and O(m) in an average case, where n denotes a total number of the plurality of items, and m denotes a number of items having direct or inherited access rights.

2. A method as in claim 1 wherein the effective permitted structure comprises a tree having a root node and a leaf node.

3. A method as in claim 1 wherein the flat data structure comprises a list including a parent.

4. A method as in claim 3 wherein the list comprises an adjacency list.

5. A method as in claim 1 wherein the access right is selected from at least one of view, read, write, and delete.

6. A method as in claim 1 wherein the user comprises a first tenant residing within a customer landscape, the access right different from another access right of a second tenant also residing within the customer landscape.

7. A method as in claim 1 wherein the user comprises a first tenant residing within a first customer landscape, the access right different from another access right of a second tenant residing in a second customer landscape.

8. A method as in claim 1 wherein:
   the first input and the second input are processed by an in-memory database engine of an in-memory database; and
   the database comprises the in-memory database.

9. A method as in claim 1 wherein the flat data structure is also stored in the in-memory database.

10. A non-transitory computer readable storage medium embodying a computer program for performing a method, said method comprising:
    receiving as a first input, a flat data structure comprising a plurality of items and respective item details;
    receiving as a second input, permissions for direct access rights by a plurality of users to the plurality of items;
    recursively processing the first input and the second input to find nearest ancestors having the direct access rights;
    maintaining a hash to including the nearest ancestors;
    generating an effective permitted structure by recursively adding descendant items having inherited access rights, to the nearest ancestors;
    storing the effective permitted structure in a database; and
    distributing a descendant item privately to a user with an access right according to the effective permitted structure,
    wherein the effective permitted structure comprises a tree having a root node and a leaf node, and
    wherein maintaining the hash limits the recursive processing of the first input and the second input such that traversing of ancestor items is O(n) in a worst case, and O(m) in an average case, where n denotes a total number of the plurality of items, and m denotes a number of items having direct or inherited access rights.

11. A non-transitory computer readable storage medium as in claim 10 wherein the flat data structure comprises a list.

12. A non-transitory computer readable storage medium as in claim 10 wherein the access right is selected from at least one of view, read, write, and delete.

13. A computer system comprising:
one or more processors;
a software program, executable on said computer system, the software program configured to cause an in-memory database engine of an in-memory database to:
receive as a first input, a flat data structure comprising a plurality of items and respective item details;
receive as a second input, permissions for direct access rights by a plurality of users to the plurality of items;
recursively process the first input and the second input to find nearest ancestors having the direct access rights;
maintain a hash to including the nearest ancestors;
generate an effective permitted structure by recursively adding descendant items having inherited access rights, to the nearest ancestors;
store the effective permitted structure in the in-memory database; and
distribute a descendant item privately to a user with an access right according to the effective permitted structure,
wherein maintaining the hash limits the recursive processing of the first input and the second input such that traversing of ancestor items is O(n) in a worst case, and O(m) in an average case, where n denotes a total number of the plurality of items, and m denotes a number of items having direct or inherited access rights.

14. A computer system as in claim 13 wherein the flat data structure is also stored in the in-memory database.

15. A computer system as in claim 13 wherein the effective permitted structure comprises a tree having a root node and a leaf node.

16. A computer system as in claim 13 wherein the access right is selected from at least one of view, read, write, and delete.

17. A computer system as in claim 13 wherein the flat data structure is stored in the in-memory database.

18. A computer system as in claim 13 wherein the user comprises a first tenant residing within a first customer landscape, the access right different from another access right of a second tenant further within a second customer landscape.

* * * * *